United States Patent Office
3,521,696
Patented July 28, 1970

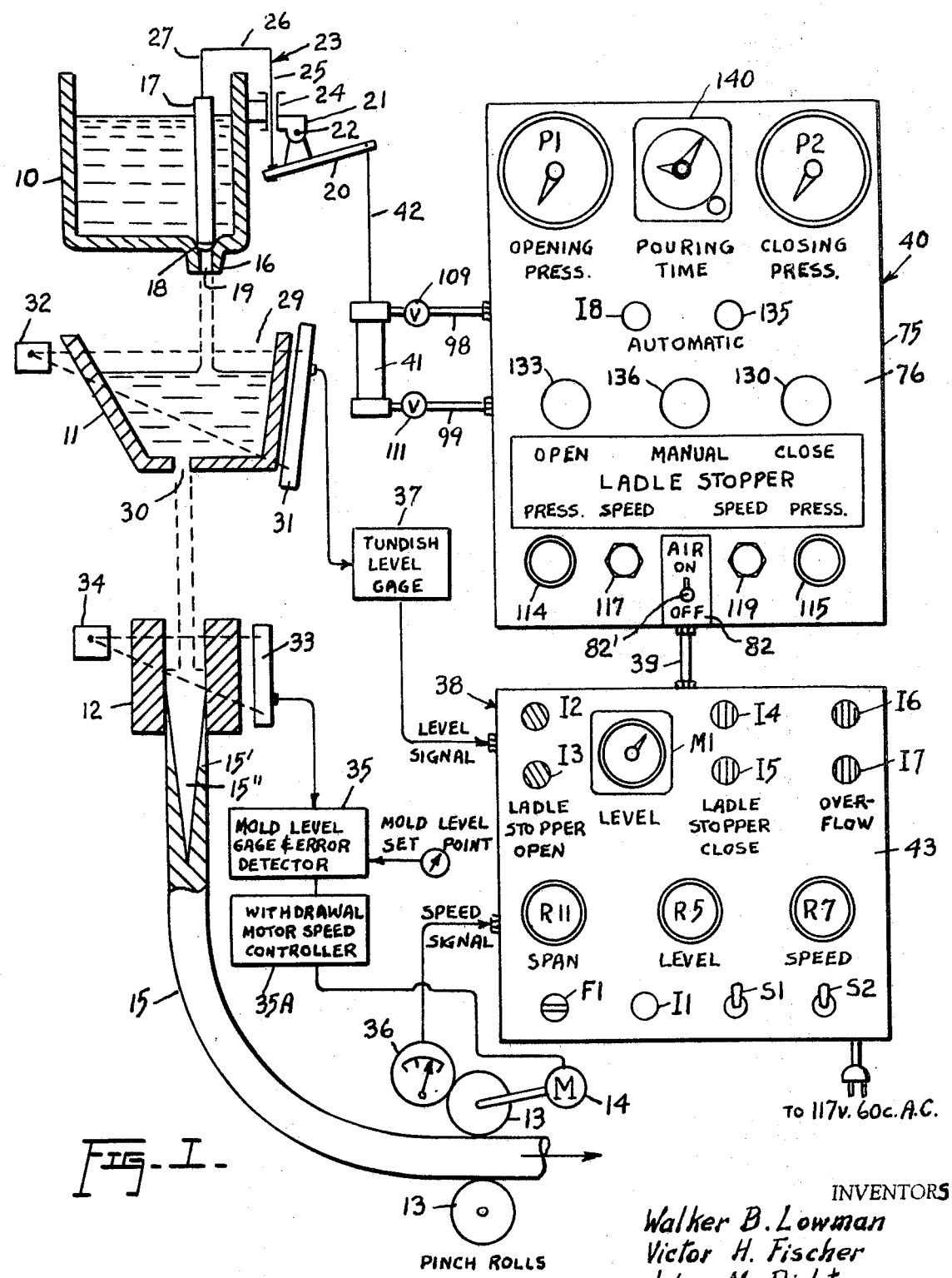
Fig. I.

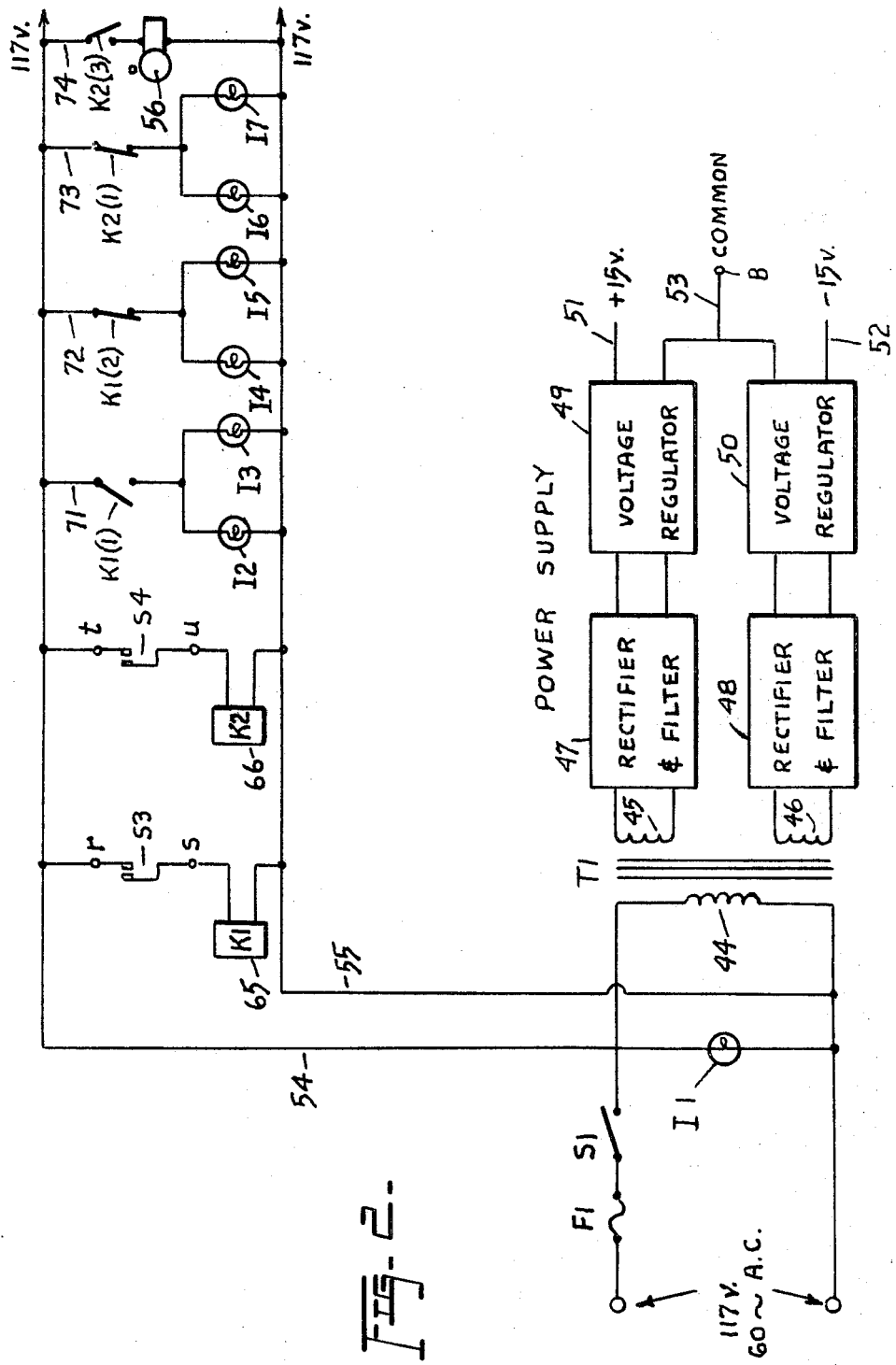

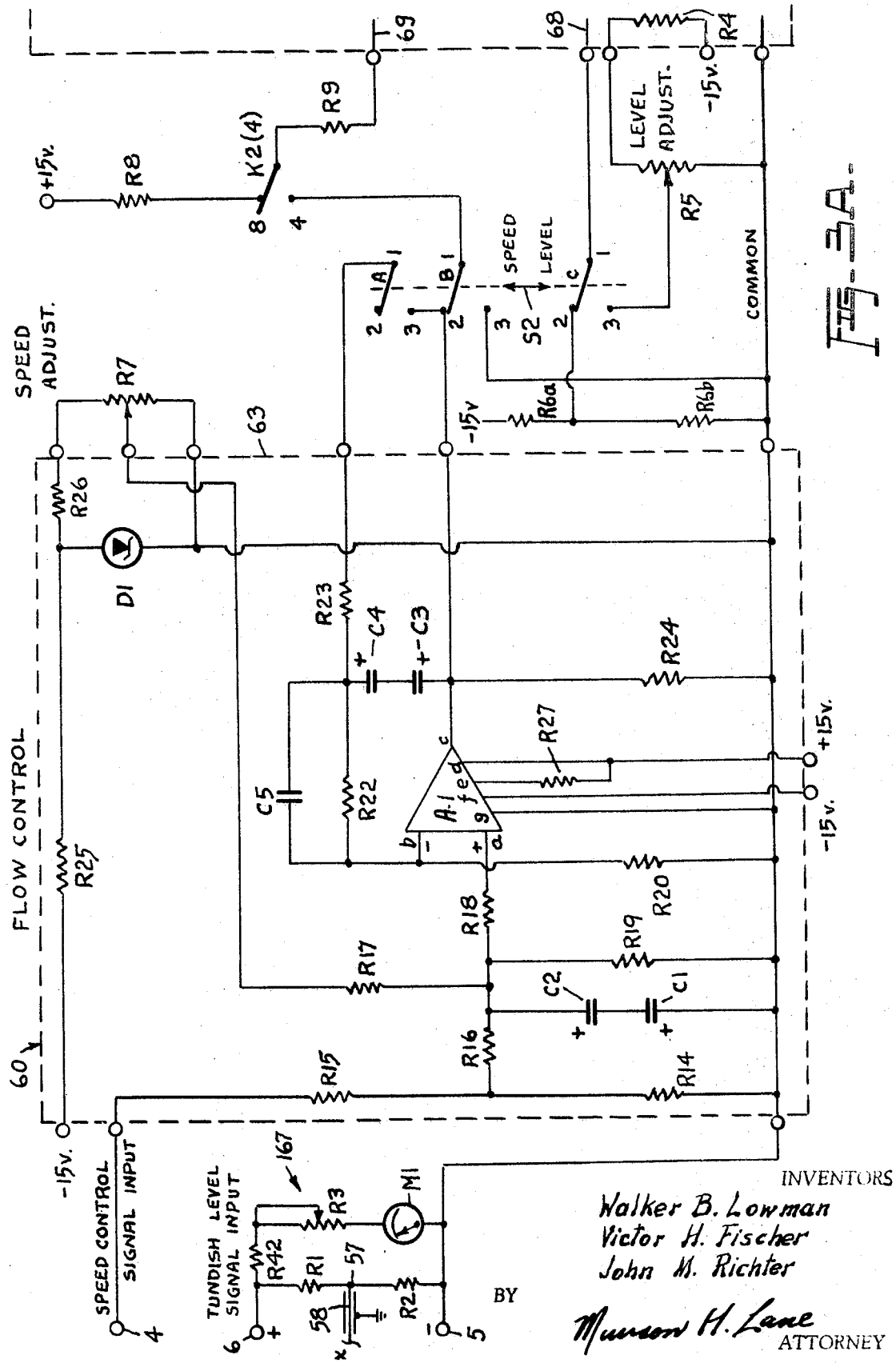

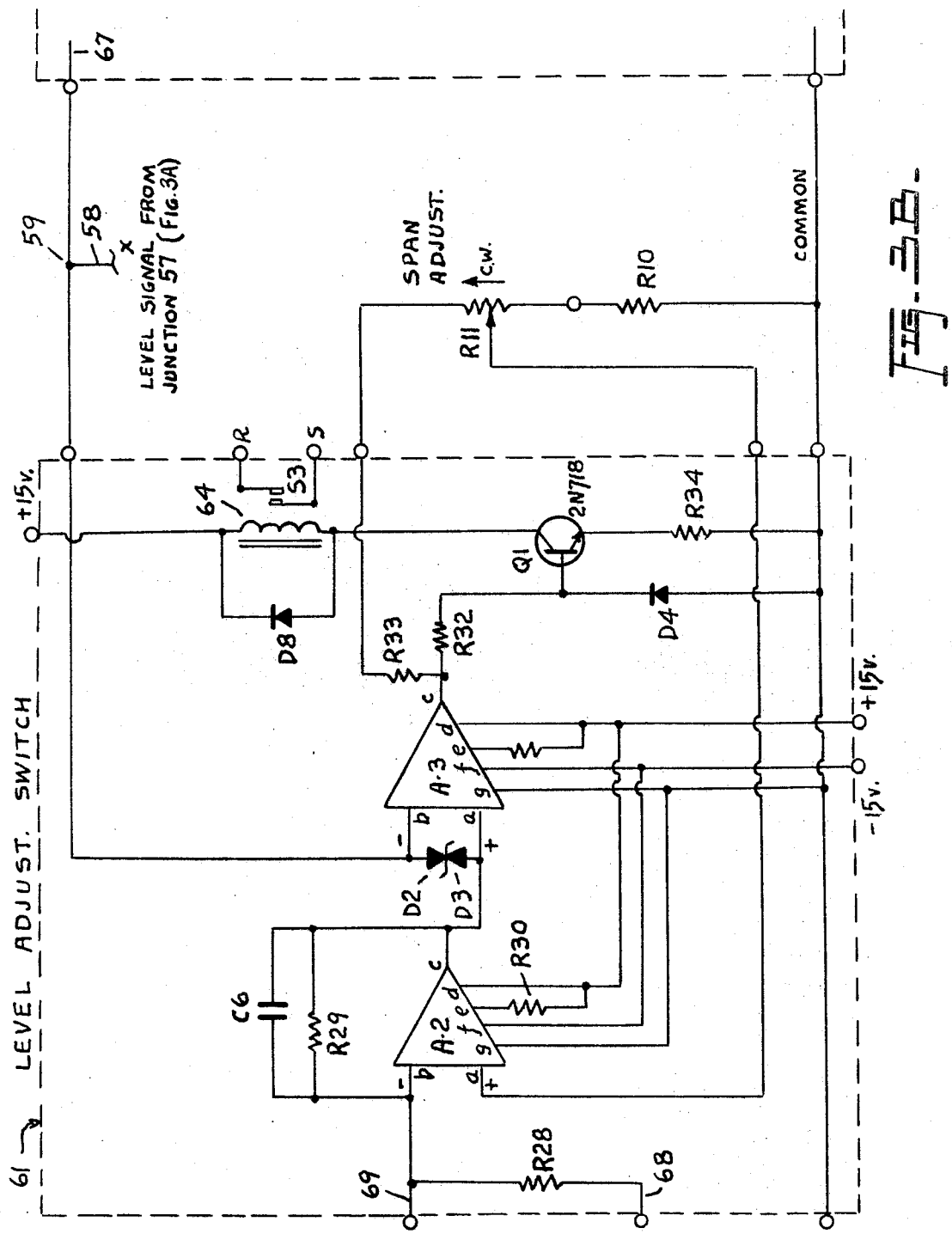

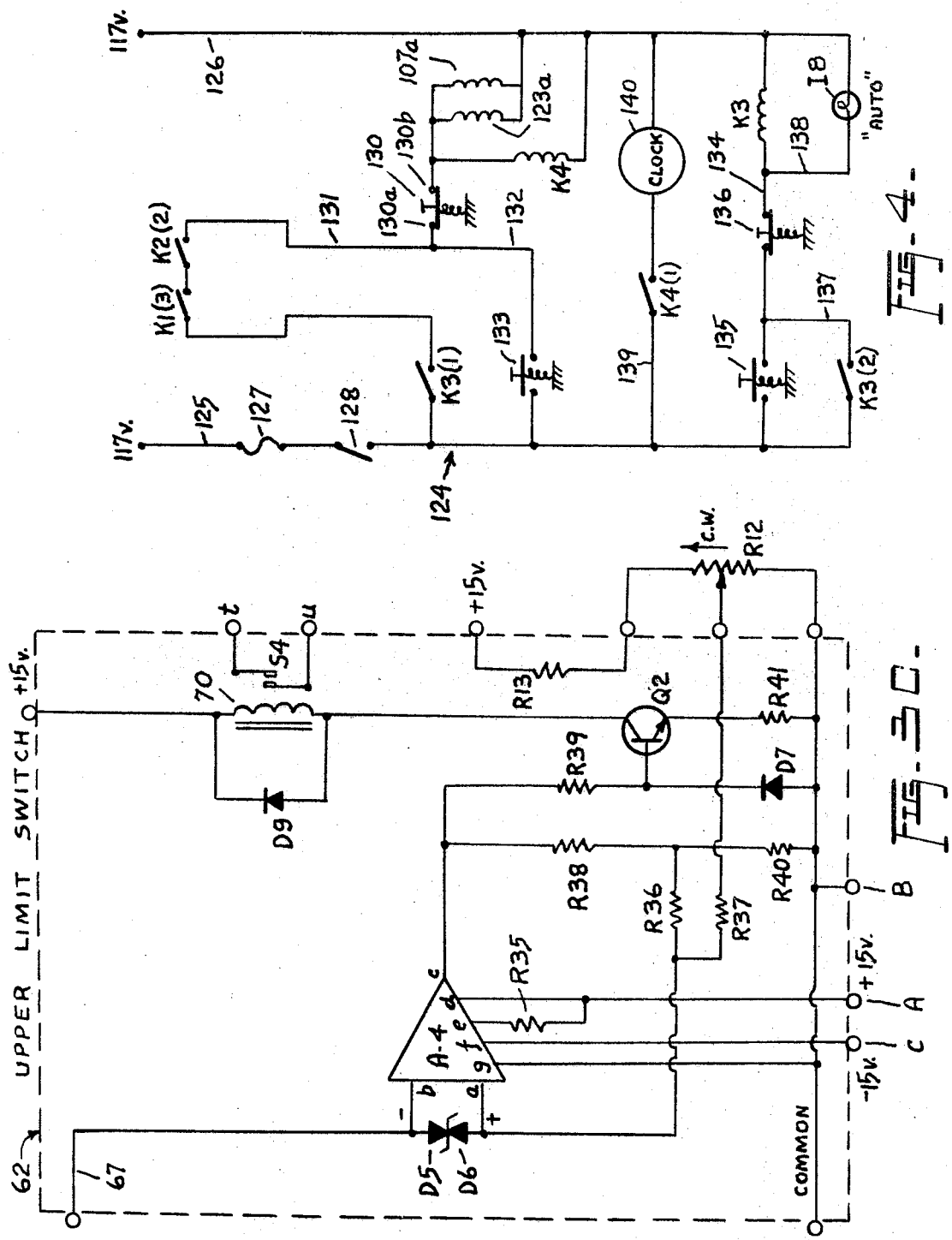

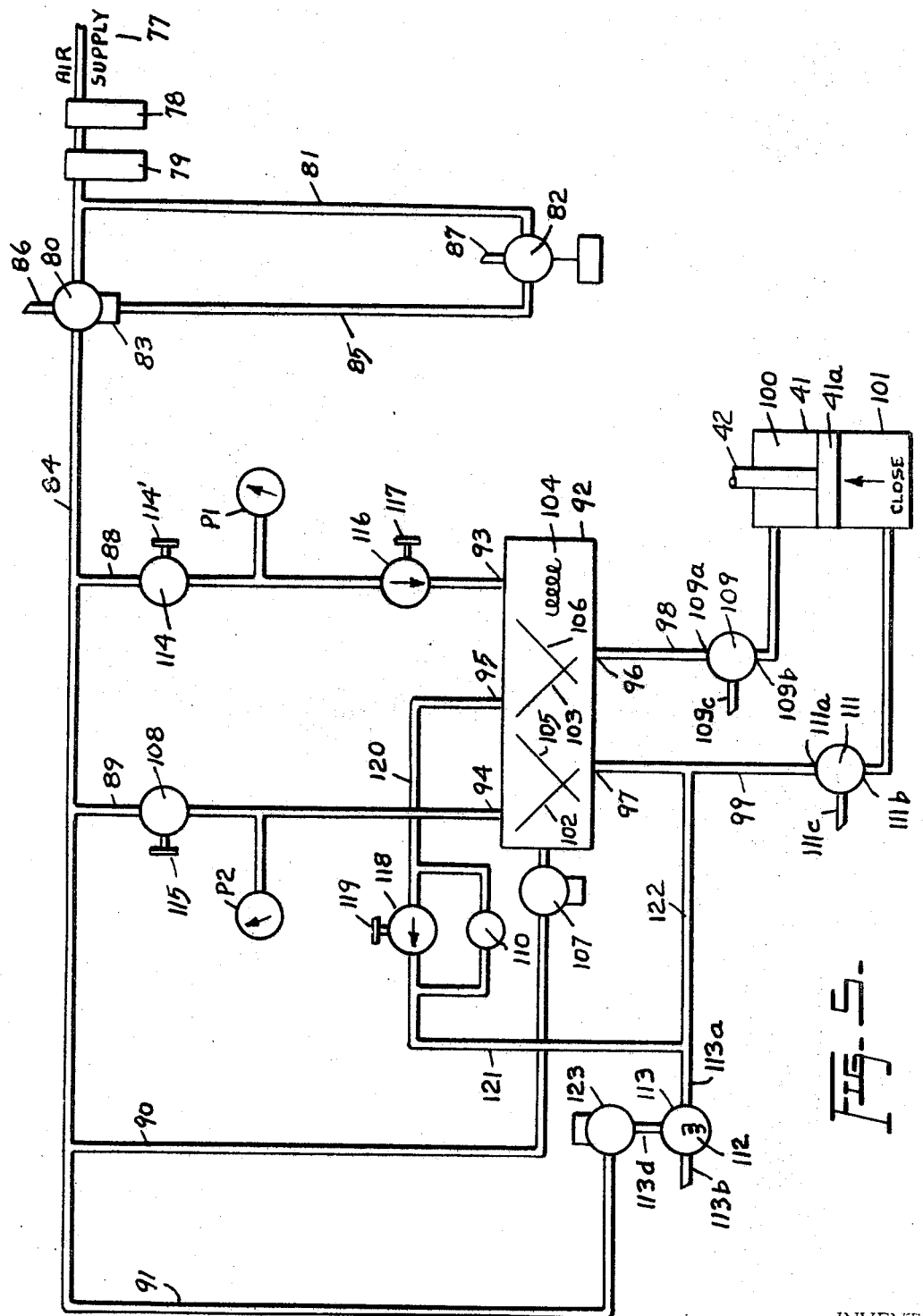

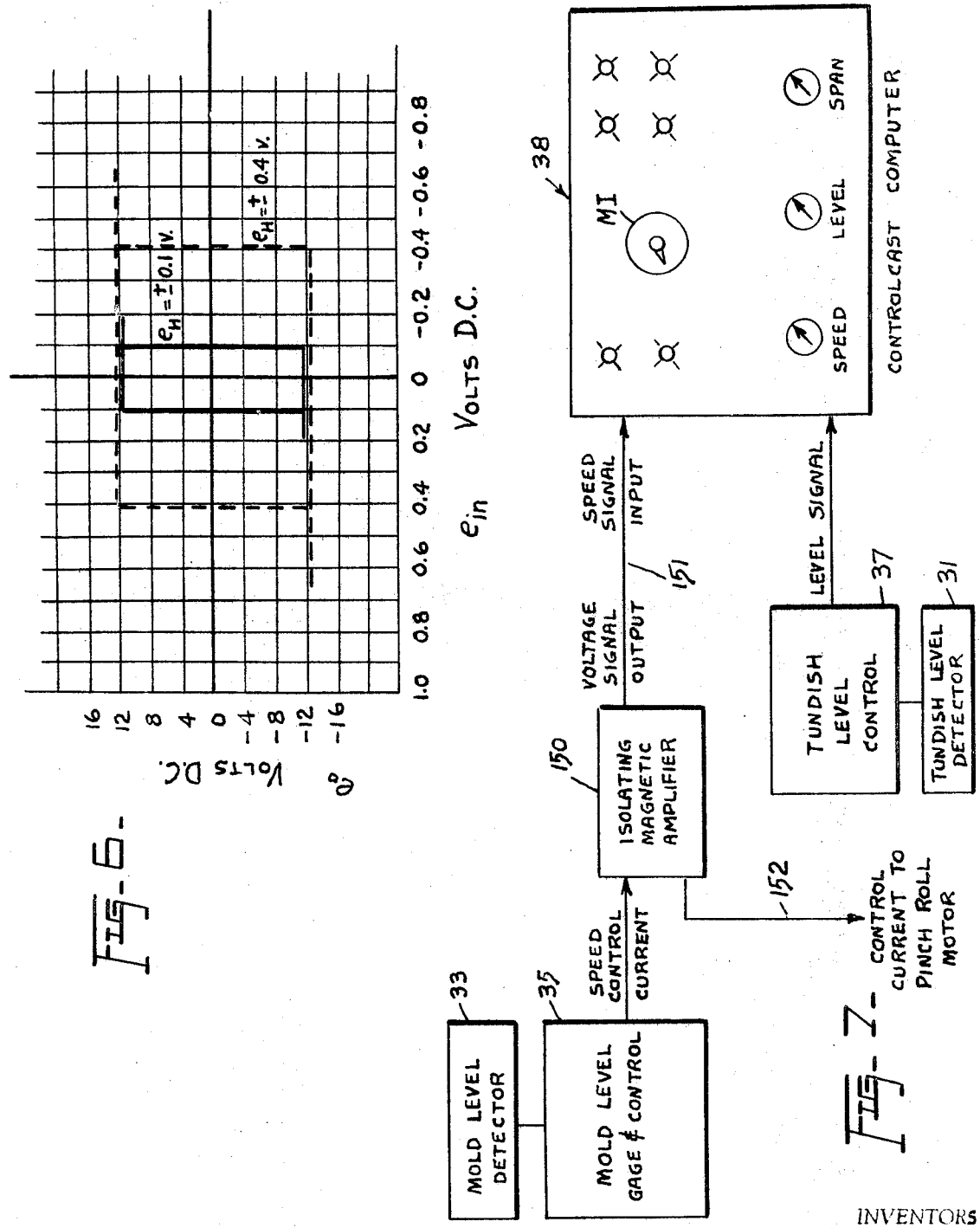

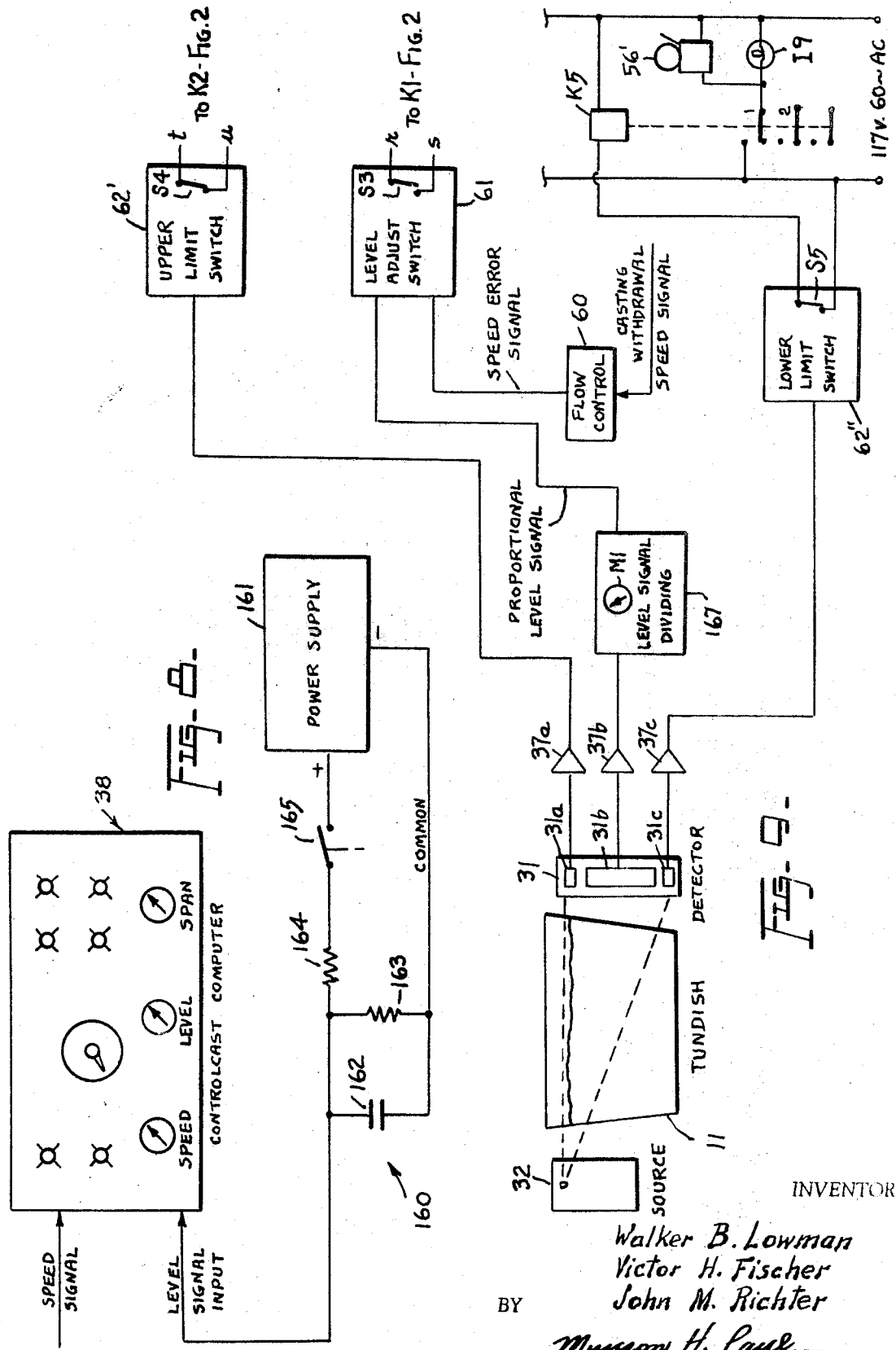

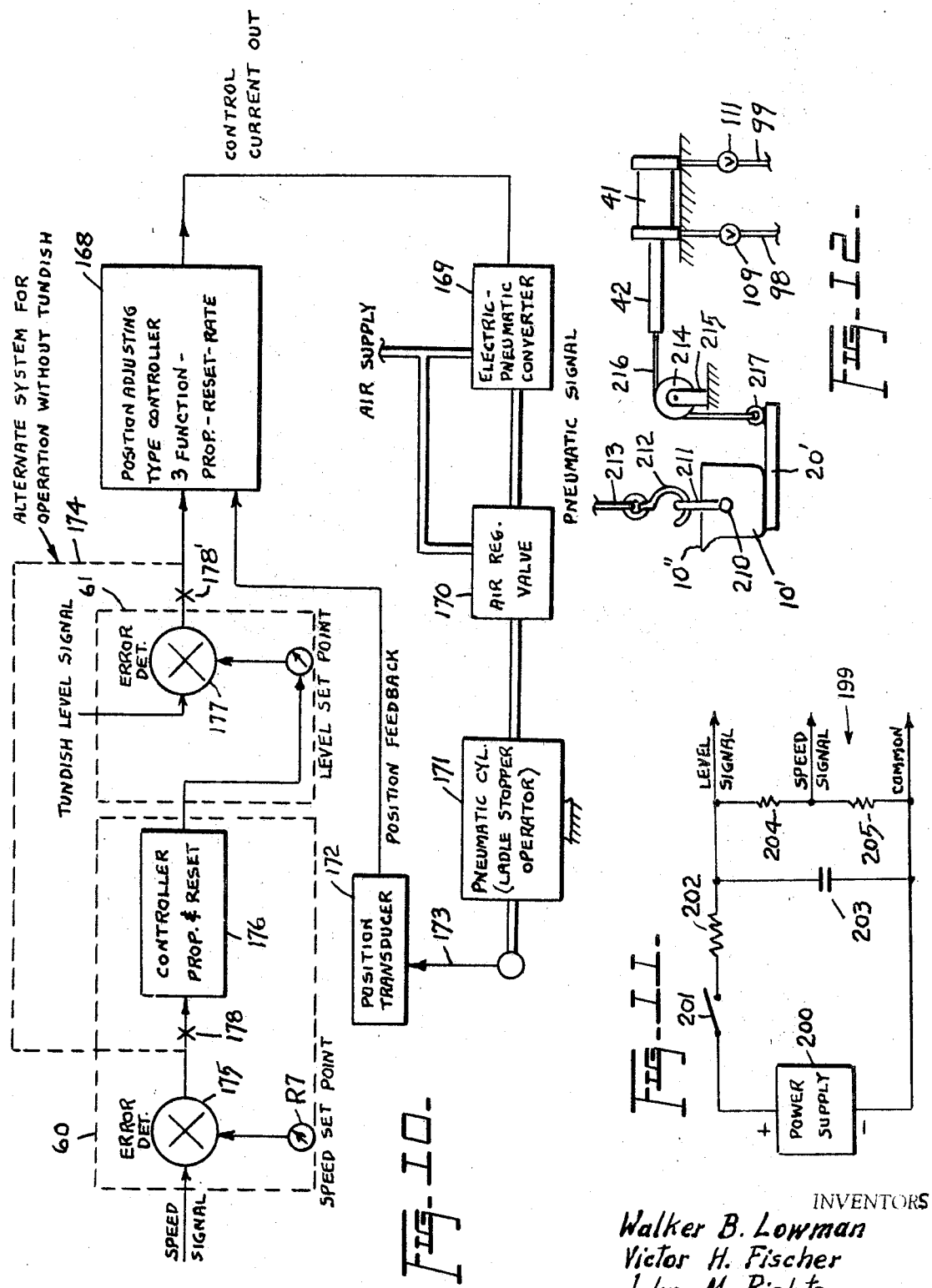

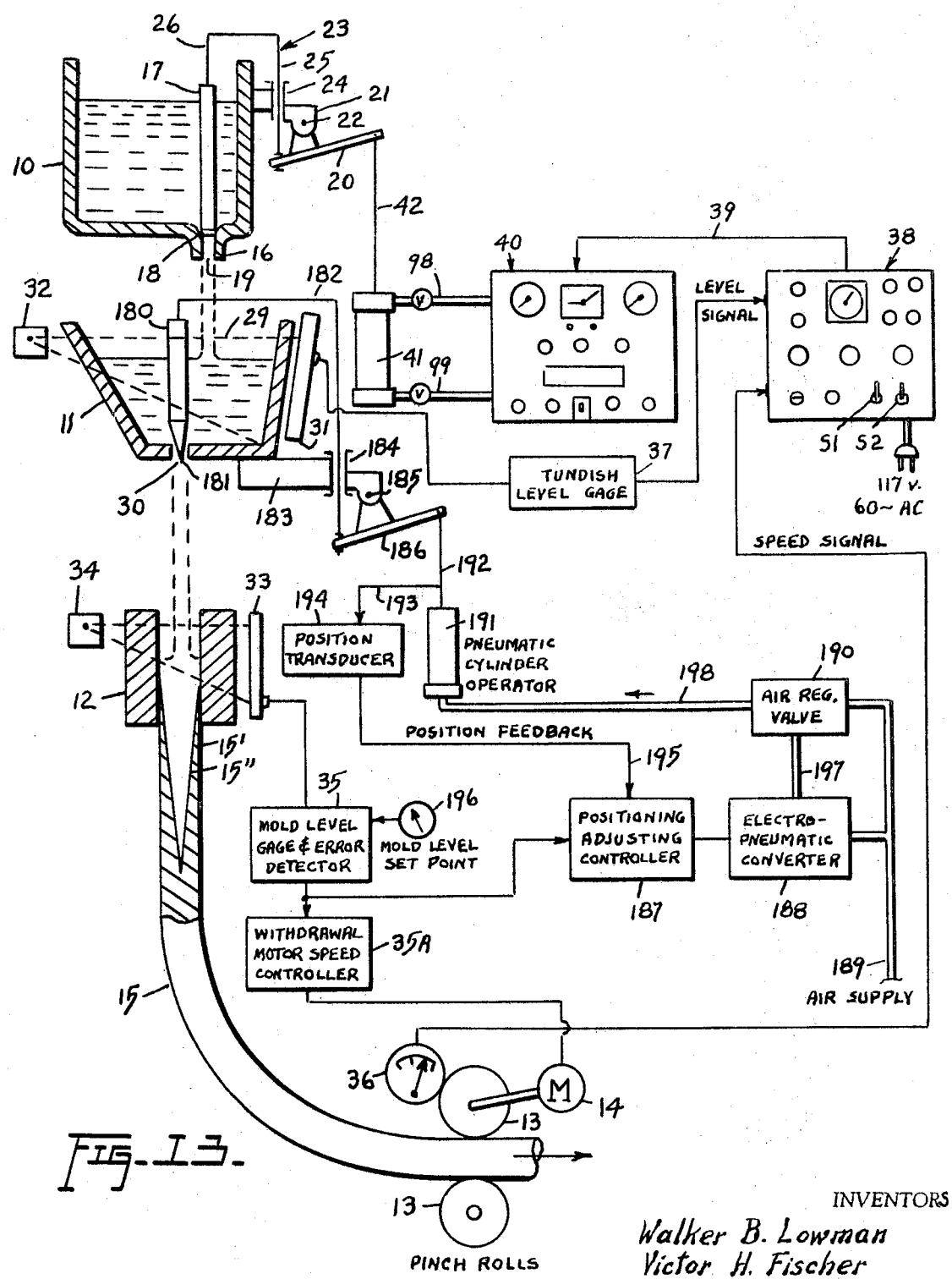

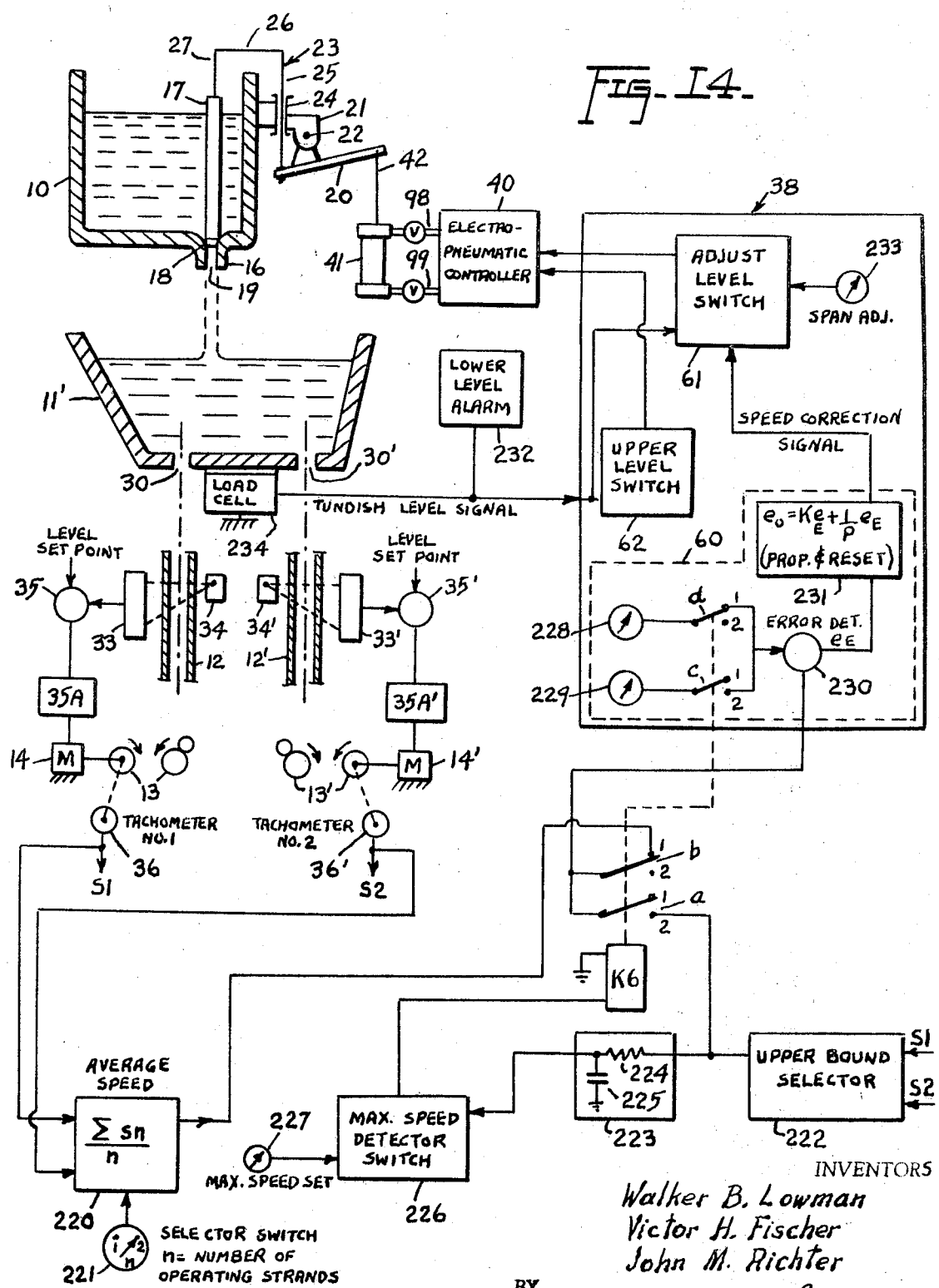

3,521,696
CONTINUOUS CASTING LINE SPEED CONTROL
Walker B. Lowman, Victor H. Fischer, and John M. Richter, Columbus, Ohio, assignors to Brun Sensor Systems, Inc., Columbus, Ohio, a corporation of Ohio
Filed Apr. 19, 1967, Ser. No. 632,021
Int. Cl. B22c 19/04
U.S. Cl. 164—154          30 Claims

ABSTRACT OF THE DISCLOSURE

In a continuous metal casting system having a continuous metal casting mold, a feed vessel feeding molten metal into the mold, a ladle supplying molten metal to the feed vessel, pinch rolls for withdrawing the casting from the mold, and a variable speed motor system for driving the pinch rolls at a controlled rate of speed, a control system for maintaining the casting withdrawal speed constant within close tolerance, and for controlling the supply of molten metal to the vessel feeding molten metal into the mold to maintain a controlled molten metal delivery to the mold at a rate interrelated to the casting withdrawal speed. The control system comprising a gage for measuring the level of molten metal in the mold and producing a mold level signal, a variable speed motor and motor control responsive to the mold level signal for controlling the casting withdrawal speed, a gage for measuring the level of molten metal in the feed vessel and producing a feed vessel level signal and a gage for measuring the casting withdrawal speed and producing a casting withdrawal speed signal, an adjustable reference speed signal source for producing a preselected reference speed signal, a first computer section which electrically compares the casting withdrawal speed signal with the preselected reference speed signal to obtain a speed error signal, a second computer section responsive to the feed vessel level signal and the speed error signal for computing the operating level for molten metal in the feed vessel necessary to reduce the speed error signal to zero, and flow control means responsive to the second computer section for controlling the flow of metal from the ladle to the feed vessel in such a way as to maintain the level of molten metal in said feed vessel at the aforesaid operating level.

The control system may include in addition an upper level control device which is responsive to a preselected level limit condition of molten metal in the mold feed vessel to stop the flow of metal from the ladle to the mold feed vessel. Various modifications of the disclosure are described in the specification.

CROSS-REFERENCE TO RELATED APPLICATIONS

The following application is referred to in the specification:

Application of Donald C. Brunton and Walker B. Lowman, Ser. No. 558,050, filed June 16, 1966, for Radiation Level Gauge with Multiple Detector System. The aforesaid application has a common assignee with the instant application and is now abandoned.

This invention relates to continuous metal casting systems and automatic controls therefor. It particularly relates to measuring means for measuring the casting withdrawal speed, the level of metal in the casting mold and the level of metal in the vessel feeding the casting mold and control means responsive to the one or more of the measured conditions for maintaining the casting withdrawal speed substantially constant with only slight variations and for closely regulating the molten metal level within the casting mold to permit the casting withdrawal speed to be maintained substantially constant.

In a continuous metal casting machine, the production rate at which the product is formed is determined by the rate of inflow of metal to the product forming mold. As the inflow rate increases, casting speed must be increased in like fashion to prevent the mold from overflowing. Since overflowing of the mold is hazardous and damaging to machinery and inadequate pool level in the mold causes formation of an inferior product and inadequate skin thickness formation in the mold leading to the possibility of molten metal breakout at the bottom of the mold, mold level is normally regulated manually or automatically by adjusting casting speed to compensate for changes in metal inflow. One method of automatically controlling mold level is described in the copending patent application of Donald C. Brunton and Walker B. Lowman, Ser. No. 558,050, filed June 16, 1966.

Wide variations in casting speed, however, are known to be detrimental to product quality and production economics. Too high a casting speed can result in insufficient skin formation at the mold and in the cooling chambers and greatly increase the probability of a destructive liquid metal breakout through the product skin. Too low a casting speed results in lower production and, occasionally, excessive skin cooling which is conducive to cracks. Such excessive cooling, if any, occurs below, not in, the mold. It is generally considered that there is an optimum casting speed which is somewhat less than the speed at which liquid metal breakouts occur.

Metal inflow to the mold varies for a number of reasons including the size of the feeding vessel outflow nozzle, the temperature and viscosity of the metal in the vessel, and the pressure head of the liquid metal in the feeding vessel. The conditions in the feeding vessel can vary during a cast due to erosion of the nozzle, cooling of the liquid metal and inadequate control over the metal level in the feeding vessel. If mold level is controlled by adjusting casting speed, each variation in conditions in the feeding vessel results in a change in casting speed. The present invention is designed to overcome this disadvantage by regulating one of the variables in the feeding vessel in such a way as to maintain casting speed relatively constant and at a predetermined value while mold level is also being maintained.

It is another function of the invention to prevent the regulated feeding vessel variable from reaching a dangerous condition. Such a condition might be excessive height of metal in the feeding vessel threatening an overflow. The feeding vessel will be referred to hereafter as the tundish in accordance with industry practice.

OLD METHODS OF PERFORMING THE FUNCTION

The functions of maintaining casting speed within acceptable limits and restricting feeding vessel variables within safe limits have previously been, and in most cases are currently being, performed by manual observation and adjustment. In a typical casting line installation, one operator will observe the level of molten metal in the mold and adjust speed so as to maintain the level within an acceptable range. A second operator will observe casting speed either by observing the movement of the cast section or by observing an indicator connected to a tachometer that reports cast section withdrawal speed. As required, he will adjust a tundish variable to keep casting speed within an acceptable range. The tundish variable to be adjusted is the height of metal in the tundish which is altered by controlling the flow of metal from a ladle feeding the tundish. The second operator further makes it his responsibility to see that the level of metal in the tundish does not reach the overflow point, irrespective of the speed requirements of the casting machine.

ADVANTAGES OF THE INVENTION OVER THE OLD METHOD

Due to the job requirements of the various operators around the casting machine, it is rarely possible for any of them to give their full attention to the functions outlined above, they, therefore, perform these functions intermittently, which results in wide variations in mold level, tundish level and casting speed. Such variations occasionally exceed the normal limits of the process, resulting in metal breakouts, mold and tundish overflows, low production rates and poor product quality. All such results are economically disadvantageous to the producer of continuously cast metal sections. By monitoring the variables to be controlled continuously, the present invention holds them within much closer tolerances, significantly reducing the economic losses described above. By virtue of continuous observation and automatic control of the level and speed variables, the invention also frees operators to perform their remaining duties more effectively, thus improving product quality and process efficiency.

OPERATION OF THE INVENTION

The Mold Level Control System has provision for selecting the level at which the molten metal in the mold will be held. Once this level is selected, the mold level control operates to maintain it by changing withdrawal or casting speed in proportion to a change of level. Should the level begin to fall, casting speed is decreased until the level stops falling and is returned to the selected level. As the level rises, casting speed is increased until the level stops rising and falls to the selected level.

The casting line speed control system has provision for selecting the desired casting speed. With constant mold level, casting speed is proportional to the inflow rate of metal into the mold. This inflow rate of constant nozzle size and metal viscosity is, in turn, proportional to the height of metal in the tundish. A change in nozzle size or metal viscosity changes the tundish level for a constant inflow rate but does not change the basic relationship of tundish level to metal inflow rate. Therefore, casting speed can be changed by changing the height of metal in the tundish.

The speed control portion of the invention senses actual casting speed and compares it with the selected casting speed. If the actual casting speed is less than the selected casting speed, the speed control system opens the ladle stopper rod by means of an electro-pneumatic system hereafter referred to by the name Controlpor which causes the level of metal in the tundish to rise until casting speed reaches the desired value. If casting speed is too high, the above process is reversed, that is, the casting speed control system closes the ladle stopper rod by means of the Controlpor until the tundish level is reduced to the point where metal inflow and casting speed coincide with the desired speed.

A tundish level gauge can be incorporated in the system so that the opening and closing of the ladle stopper rod can be related to actual levels in the tundish. The speed control would then perform its function of changing tundish level by altering the operating set-point of the control system that opens and closes the ladle stopper rod in response to a change in tundish level.

The tundish level gauge also performs the function of sensing an excessive metal level that creates a danger of overflow and closes the ladle stopper to reduce tundish level until it is again within a safe range. This overflow alarm function over-rides the demands of the speed control system.

When multiple strands are served by one tundish, different nozzle sizes and conditions may result in different flow rates for the same tundish metal level. It is necessary, therefore, that the speed control system either:

(1) Sense the speed error of each strand and maintain tundish metal level so as to maintain desired average casting speed, or:

(2) Select the strand with highest speed and adjust tundish metal level so as to maintain this strand at the desired casting speed.

In alternative 1, it is assumed that the allowable maximum casting speed is higher than the desired average. Therefore, if the speed discrepancy between fastest and slowest strand is not too great, average production rate can be maintained without any strand exceeding a safe speed. As soon as one strand reaches maximum allowable speed, however, the control system must act to prevent an increase in tundish metal level that would permit a further speed increase in that strand. Alarms associated with the control system will indicate when a strand has reached maximum allowable speed. The control system will react in a similar fashion when a marked slowdown in one or more of the strands forces the remaining strands to or potentially above the allowable maximum speed in an attempt to maintain the desired average.

Suitable alarms associated with alternative 2, will be actuated when a large discrepancy between the fastest and slowest strand occurs.

ALTERNATE METHODS OF CONSTRUCTION

There are several alternate methods of construction of the invention as follows:

(1) The continuous measurement function of the tundish level gauge can be eliminated employing instead only a level switch to sense excessive levels and close the ladle stopper rod. In this case, the opening and closing of the ladle stopper rod is performed by a control system associated only with casting speed.

(2) Since the output of the mold level control system is a speed adjustment signal, it is not necessary to sense the speed of the cast section withdrawal drive in order to compare it with the desired speed. It is equally possible to compare the speed adjustment signal from the mold level control system with a selected set-point and use the error signal to operate the ladle stopper rod operator control or the tundish level control system set-point.

(3) Metal level in the mold can also be controlled by a mold level gauge and controller that adjusts a tundish stopper rod to regulate tundish metal flow in response to mold level errors. In such a system, the tundish stopper can be opened and closed to maintain mold level within the limits of a band or modulated to keep mold level at the set-point. The present control system then acts to maintain an adequate level of metal in the tundish to enable the stopper control to perform effectively. It is necessary, for instance, that there be adequate metal level in the tundish to permit the tundish stopper open position to supply metal to the mold at a rate equal to or greater than the metal withdrawal rate.

(4) While the general description given above implies two-position control of the ladle stopper, namely: full open and full closed, the system will obviously perform even better if the position of the ladle stopper is modulated so as to maintain tundish level precisely at the desired set-point.

Mold level has previously been controlled by altering casting speed and tundish level has previously been controlled by opening and closing a ladle stopper rod, however, to the inventors' knowledge these systems have not previously been combined with a speed sensing system to maintain all casting level and speed variables at optimum value.

These and other objects, advantages and novel features will be apparent from the following description and the accompanying drawings.

In the drawings:

FIG. 1 is a diagrammatic view illustrating a continuous casting machine with the measuring gages and control panels of the present invention.

FIG. 2 is a diagrammatic view of the power supply (shown in block form) and certain of the control relays, indicator lights and audible alarm (shown in schematic form) of the invention.

FIGS. 3A, 3B and 3C, taken in sequence, are a schematic diagram of the control signal computing portion of the invention referred to as Controlcast.

FIG. 4 is an electrical schematic diagram of the casting ladle pneumatic motor electrical control portion of the invention.

FIG. 5 is a schematic diagam of the pneumatic system for the casting ladle pneumatic motor.

FIG. 6 is a graph showing the input-output characteristic of the adjustable hysteresis switching amplifier A3 used in a portion of the invention.

FIG. 7 is a block diagram of a modified embodiment of the invention.

FIG. 8 is a block diagram of a second modified embodiment of the invention.

FIG. 9 is a block diagram of still a third modified embodiment of the invention, and FIG. 10 is a block diagram of a fourth modified embodiment of the invention.

FIG. 11 is a schematic diagram of a continuous metal casting system electrical simulator network.

FIG. 12 is a side elevation illustrating a tilting ladle which can be used instead of the ladle with stopper shown in FIG. 1.

FIG. 13 is a vertical sectional view of a modified continuous metal casting system with controls of the present invention illustrated in block diagram form.

FIG. 14 is a vertical sectional view of a multi-strand continuous metal casting system with controls of the present invention illustrated in block form.

Referring to FIG. 1, the continuous metal casting system of one embodiment of this invention includes the following conventional components: a ladle 10 containing molten metal, for example liquid steel, a tundish 11 positioned beneath the ladle to receive molten metal from the ladle, a continuous casting mold 12 positioned beneath the tundish to receive a regulated flow of molten metal from the tundish, and pinch rolls 13, driven by a variable speed electric motor 14 to withdraw the solidifying casting 15 from the mold 12 at a controlled rate of speed.

The ladle 10 is of the bottom discharge type which includes a bottom discharge nozzle 16 formed therein, and a reciprocating stopper 17 which is mounted in the ladle for vertical rectilinear motion from a position (shown in FIG. 1) where the stopper in sealing contact with a sealing face 18 at the mouth of the opening 19 in the discharge nozzle, to a position above the sealing face 18 where the flow of liquid metal from the ladle is uninhibited by the stopper.

A stopper actuating lever 20, pivotally connected by a pivot pin 22 to a bracket 21 attached to the outside wall of the ladle is adapted to open and close the stopper by means of an inverted U-shaped connecting rod 23. One leg 25 of the connecting rod 23 is slidably mounted in a vertical slide bearing 24 which is mounted in the bracket 21; it is pivotally connected to the lever 20 at the free end. The bight portion 26 of the connecting rod extends over top of the ladle 10 and the other leg 27 of the connecting rod is secured to the stopper 17 in vertical alignment therewith. Counter-clockwise movement of the lever 20 lowers the stopper 17 to its closed position while clockwise movement of the lever 20 raises the stopper to its open position. Molten metal is fed into the ladle from a suitable furnace not shown.

The tundish 11 is an intermediate vessel having an open top 29 through which it receives molten metal from the ladle 10, and a bottom discharge opening 30 through which molten metal flows into the mold 12. While the tundish shown in FIG. 1 has an open top, there are other tundishes which can be used satisfactorily that have closed tops with only a hole for introduction of metal from the ladle.

The mold 12 is of a conventional continuous metal casting type which is water cooled and oscillated in such manner to prevent the solidifying metal within the mold from sticking to the mold surfaces. As molten metal solidifies in the mold 12 forming a solidifying skin 15′ about a molten core 15″, it is continuously withdrawn from the bottom of the mold at a controlled rate of speed so that there is always a solidifying skin around the casting of sufficient strength to retain the molten core. If the casting is withdrawn too fast so that the solidifying skin 15′ of the casting no longer retains the liquid core 15″ a break-out condition occurs whereby molten metal flows out of the mold through the cracks in the skin 15′.

It has been previously stated in this specification that it is desirable to maintain a constant casting withdrawal speed and to maintain a pool of molten metal in the mold of substantially constant level. In order to maintain the casting withdrawal speed constant within close tolerances and to control the feed of molten metal from a ladle to the casting mold, this invention provides the apparatus now to be described.

A tundish level gage 37 is provided to measure the level of molten metal in the tundish 11. The tundish level gage 37 shown in FIG. 1 is a radiation level gage deriving measuring signals from a detector 31 positioned adjacent one outside wall of the tundish; a source of radiation 32 positioned adjacent the opposite outside wall of the tundish 11 emits a divergent band of radiations directed toward the detector 31. One suitable source of radiation is a quantity of radioactive material such as cobalt 60 which emits gamma rays capable of pentrating the walls of the tundish but not the liquid metal within the tundish. The detector 31 includes at least a proportional detector which produces an electric output signal that is inversely proportional to the level of molten metal within the tundish. It may also include additional detectors such as an upper level limit detector and a lower level limit detector which produce output signals for alarm or emergency control functions, when upper or lower limits of level are reached, however, in FIG. 1 only the proportional detector is provided. The electric signals from the tundish level detector 31 are fed to apparatus shown in block and designated tundish level gage 37. The tundish level gage 37 amplifies the detected signals and produces a D.C. output voltage level signal which is proportional to level.

The detector 31 is preferably a scintillation-photomultiplier type radiation detector because it has the necessary sensitivity needed for the measurement of radiation passing through the tundish. Radiation detectors of other types can be used provided they have the required sensitivity. Also other level gages, such as capacitance gages, can be used which are capable of measuring the level of molten metal in the tundish and of producing an electric signal which is a function of the level of the molten metal.

A casting mold level gage 35 is provided to measure the level of the molten metal pool in the mold 12. Like the tundish level gage 37, it includes a radiation source 34 positioned outside of the mold on one side thereof to pass radiation through the mold in a divergent band, and a radiation detector 33 positioned outside of the mold, on the opposite side thereof to receive the divergent band of radiation.

The radiation detector 33 like the radiation detector 31 is a scintillation-photomultiplier type detector which produces an electric output signal which is proportional to the amount of radiation received by the detector. As molten metal rises in the mold and intercepts the divergent band of radiation and absorbs radiation from the radiation source 34, the radiation being received by the detector 33 becomes less as an inverse function of the height of molten metal in the mold. The detector 33 therefore produces an electric output signal which is inversely proportional to the level of molten metal in the mold 12. The mold level gage and error detector 35 amplifies the detected signal from the detector 33, compares the amplified signal with a preselected mold level set point and produces a mold level error signal which is fed to a withdrawal motor speed controller 35A, such as a Leeds and Northrup M-Line C.A.T. controller, which functions to increase or decrease the speed of the variable speed motor 14 as the level of the metal in the mold 12 rises or falls. The casting mold level gage 35 and the tundish level gage 37 are basically similar to the radiation level gage described in the copending patent application Ser. No. 558,050, now abandoned previously referred to.

The withdrawal speed of the solidfying casting 15 is measured by a D.C. generator type tachometer 36 driven by the pinch rolls 13. The tachometer 36 produces a D.C. output voltage signal which is proportional to the withdrawal speed of the casting 15.

The speed signal from tachometer 36 and the level signal from the tundish level control 37 are fed to a control system 38 which hereafter will be described and referred to in the specification as the Brun Controlcast. Output signals from the Brun Controlcast are fed via a cable 39 to a second control system 40 hereafter described and referred to as the Brun Controlpor.

The Brun Controlpor is an electro-pneumatic control system which uses the electric output signals from the Brun Controlcast to control pneumatic power means for operating a pneumatic motor 41. The pneumatic motor 41 is a double acting piston and cylinder motor having a piston rod 42 connected to the stopper actuating lever 20 for raising and lowering the stopper 17.

The Brun Controlcast system 38 is contained within a control panel housing 43. On the front face of the panel housing 43 are located an actuating lever for an on-off power supply switch S1, a power supply fuse F1, an actuating lever for a two position, three pole level-speed switch S2, an adjustment knob for a span potentiometer R-11, an adjustment knob for a level potentiometer R-5, and an adjustment knob for a speed adjust potentiometer R-7. Also mounted on the panel housing face are a level indicator M1, a power supply "ON" indicator light I1, a pair of green ladle stopper "OPEN" indicator lights I2, I3, a pair of red ladle stopper "CLOSE" indicator lights I4, I5, and a pair of red ladle "OVERFLOW" indicator lights I6, I7.

Reference is now made to FIGS. 2, 3A, 3B and 3C which are schematic diagrams of the Brun Controlcast system.

The Brun Controlcast system consists basically of a power supply shown in FIG. 2 and three major component systems shown in FIGS. 3A, 3B and 3C. The three major component systems are designated Flow Control 60, Level Adjust Switch 61, and Upper Limit Switch 62, respectively.

Briefly stated, the Brun Controlcast system is an electrical system which compares a measured casting withdrawal speed with a desired casting withdrawal speed which is set in as a reference voltage by an operator. Variation of actual speed from desired speed adjusts the set-point of a tundish level adjust switch. The set point of the level adjust switch is, in turn, electrically compared with actual level as measured by the tundish level gage. When the actual level varies from the level-set point, the tundish level adjust switch sends a correction signal to the Brun Controlpor system which causes the ladle stopper rod to be opened or closed as required to cause a change in tundish level to bring it to the level set point.

The upper level switch functions in response to tundish level measurement signals to transmit a control signal to the Brun Controlpor system 40 when an upper limit level condition is reached in the tundish 11 to cause the ladle stopper 17 to be closed. It also causes a pair of over-flow indicator lamps 16, 17, to be lighted on the Brun Controlcast panel 43, and an audible alarm 56 to be sounded when an upper limit level condition is reached as shown in FIG. 2.

The Brun Controlcast system receives electric power from an external 117 volt, 60 cycle A.C. power line. The power line is connected to the primary 44 of transformer T1 through the (front panel mounted) fuse F1 and power on-off switch S1. A front panel mounted power-on indicator lamp I1 connected across the primary winding of the transformer T1, provides an indication to the operator when the Controlcast system power is on. The transformer T1 has a pair of secondary windings 45 and 46 which are connected to full wave rectifier and filter networks 47 and 48 shown in block. The D.C. outputs from the rectifier and filter networks 47 and 48 are connected to voltage regulators 49 and 50, respectively, which are of a suitable type to provide highly stable voltage regulation. Voltage regulator 49 provides a +15 volt D.C. output over conductor 51, while voltage regulator 50 provides a −15 volt D.C. output over conductor 52. The low side of voltage regulator 49 and the high side of voltage regulator 50 are connected to a common conductor 53. The conductors 51 and 52 which are shown broken away in FIG. 2 are actually connected to the circuit components shown in FIGS. 3A, 3B and 3C to provide regulated positive and negative D.C. voltage thereto. Likewise, the common conductor 53 shown broken away in FIG. 2 is connected to the common conductor of circuit component shown in FIGS. 3A, 3B and 3C. Junction points throughout the Controlcast system which are connected to the +15 v. conductor 51 are designated by the reference +15 v. Junction points which are connected to the common conductor are designated by the letter B, and junction points which are connected to the −15 v. conductor are designated by the reference −15 v.

Leads 54 and 55 connected across the primary winding of transformer T1 carry 117 v., 60 cycle alternating current to the relays K1 and K2, indicator lights I2, I3, I4, I5, I6 and I7, alarm 56, and other devices as may be required.

Referring to FIG. 3A, the tundish level input signal is fed into the Brun Controlcast system through terminals 5 and 6. The resistor network comprising resistors R1 and R2 (connected in series across the terminals 5 and 6) divides the 4.0 volt (full scale) signal from the level gage down to 1 volt at the junction 57 of R1 and R2. The divided level signal from the junction 57 is fed by a shielded conductor 58 (shown broken at X—X) to a junction point 59 (see FIG. 3B) intermediate the level adjust switch 61 and the upper limit switch 62.

A level indicator meter M1 and a calibration resistor R3 are connected in series across the tundish level signal input terminals 5 and 6. The meter M1 is mounted on the front panel 43 (see FIG. 1). The calibration resistor R3 is used to calibrate the full-scale current through the meter M1 to 1 milliampere.

The casting withdrawal speed signal from the tachometer 36 (or as will be later described from the mold level control output 35) is applied between terminals 4 and 5 of the component system designated "Flow Control" 60. The speed signal from the tachometer is applied to one arm of a resistive summing network comprising R16, R17 and R19, while the speed reference signal of opposite sign is applied to the opposite side. The speed reference signal, sometimes referred to as a speed set-point signal, is developed at the wiper arm of a speed/adjust potentiometer R7 which is connected in series circuit with resistors R25 and R26 between −15 volts and the common conductor. A Zener diode D1 is connected across the speed adjust potentiometer R7 and resistor R26 in series to regulate the speed reference voltage.

Whenever the tachometer output is equal in magnitude to the voltage at the wiper of the reference potentiometer, the summing network output is zero. When the tachometer output deviates from this value, an error signal is developed and applied through resistor R18 to the non-inverting input terminal a of the operational amplifier A-1. The operational amplifier is arranged so that its output is both proportional to the error signal and the time integral of the error signal.

The output of the amplifier A-1 is applied through the B pole of the manual "speed-level" switch S-2 (in the speed position) to the input of the tundish level adjust switch 61.

The amplifier A-1, like amplifiers A-2, A-3 and A-4, subsequently to be described, are solid state packaged modules, such as the PP55A U-type. The amplifier A-1 has a common terminal g connected to the common conductor, a —15 volt terminal f connected directly to the —15 volt D.C. supply, a trim terminal e connected through a zero adjust resistor R27 to +15 volt D.C., a +15 volt terminal d connected directly to the +15 volt D.C. supply, an output terminal c, a non-inverting input terminal a, and a— or inverting input terminal b. The output terminal c is connected through resistor R24 to the common conductor. It is also connected through integrating capacitors C3 and C4 and resistor R22 to the input terminal b.

The resistor R22 is shunted by a high frequency stabilizing capacitor C5. The integrating capacitors C3 and C4 in circuit with R22 cause the amplifier A-1 to incline slowly to the value desired in response to an error signal and thus prevent system oscillation. A resistor R20 is connected between the input terminal b and the common conductor and functions to set the gain (or proportionality of the amplifier A-1).

The speed level switch S2 is a three pole double throw switch comprising poles A, B and C which when in the "speed" position engage No. 2 contacts, and which in the "level" position engage No. 3 contacts. Each pole is always connected to a No. 1 contact terminal.

The No. 1 contact of pole A is connected through a resistor R23 to the junction of capacitor C4 and resistor R22, the No. 2 contact is vacant, and the No. 3 contact is connected to the No. 2 contact of pole B. The No. 1 contact of pole B is connected to the normally open contact 4 of the No. 4 pole of a relay K2; the No. 2 contact of pole B is connected to the output c terminal of amplifier A-1, and the No. 3 contact of pole B is connected to the common conductor. The No. 1 contact of Pole C is connected through a resistor R28 (see FIG. 3B) to the b input terminal of amplifier A-2 in the level adjust switch; the No. 2 contact is connected through R6B to common and through R6A to —15 v. and the No. 3 contact is connected to the wiper arm of the level adjust potentiometer R5.

Before explaining further the function of the speed-level switch S2, it is necessary to state that the level adjust potentiometer R5 is connected through a resistor R4 to the —15 volt D.C. supply. The level adjust potentiometer provides a level reference voltage depending on the position of the level adjust potentiometer wiper arm.

Also the relay K2 is a 4 pole double throw relay. The normally closed contact 8 of the No. 4 pole of relay K2 is connected through resistor R8 to +15 volts D.C. Since relay K2 (as will be subsequently explained) is energized when the system power switch S1 is on except when an upper limit level condition of the tundish is present, the No. 4 pole of K2 will be moved to open the normally closed contact 8 and close the normally open contact 4. The No. 4 pole of the relay K2 is always connected through resistor R9 to the b input terminal of amplifier A-2 in the level adjust switch 61.

Assume now that the level of molten metal in the tundish 11 is below the selected upper limit which is near overflow, so that the relay K2 is energized and the No. 4 pole of relay K2 engages its normally open contact 4, and that the "speed level" switch S2 is in the "speed" position. The A pole of S2 is then open, the C pole of S2 connects the negative potential at the junction of R6A and R6B through R28 to the b input terminal of amplifier A-2, and the B pole of S2 is then positioned to transmit the speed error signal from the output of amplifier A-1 to the b input terminal of amplifier A-2.

In the event an operator does not want to use a casting withdrawal speed error signal to control the level of molten metal in the tundish 11, he can then switch the speed level switch S2 to the level position and set in a desired level for molten metal in the tundish by means of the level adjust potentiometer R5. In the level position of S2, pole C of S2 connects the wiper arm of R5 to a voltage divider network, comprising R28 and R9 connected in series, to common through pole B of S2. The voltage level reference signal appearing at the junction of R28 and R9 is applied to the b input terminal of the amplifier A-2 and establishes a reference level input for the level adjust switch 61. The A pole of the switch S2 in the level position completes a discharge circuit for the reset capacitors C3 and C4 through R23 so that no offset will be stored in the integrator.

LEVEL ADJUST SWITCH

The level adjust switch 61 (see FIG. 3b) is a solid state voltage level comparator with adjustable hysteresis. It consists of two operational amplifiers A-2 and A-3, one of which A-3 is used in the open-loop switching mode. In this mode, the amplifier A-3 will change from full output voltage in one polarity to full output voltage in the other polarity whenever the potential on one input terminal coincides with the potential on the other input and exceeds it by at least two millivolts. The other operational amplifier A-2 is used as a summing and buffer-amplifier.

The amplifier A-2 and A-3 are structurally alike, being packaged modules having terminals a to g. Terminals a and b are input terminals having inputs which will be subsequently described. Terminal c is the output terminal. The d terminals of A-2 and A-3 are connected to +15 volts D.C. The e terminals of A-2 and A-3 are connected through trim resistors R30 and R31 respectively, to +15 volts D.C. The f terminals of both amplifiers are connected to —15 volts D.C. and the g terminals are connected to common.

The amplifier A-2 and A-3 are structurally alike, be-speed error signal and/or a level reference voltage through its b input terminal as has been previously described. It receives a span adjust signal from the wiper arm of a span adjust potentiometer R11. The amplifier A-2 sums the speed correction signal (and/or level reference signal) with the span adjust signal and produces a summation output signal at terminal c which is connected directly to the a input terminal of the amplifier A-3. An amplifier stabilizing feed-back network comprising capacitor C6 and resistor R29 in parallel is connected between output terminal c and input terminal b of amplifier A-2.

The amplifier A-3 operates as a bi-stable voltage sensitive switch with adjustable hysteresis. It receives a tundish level measurement signal at its b terminal from the level signal divider network junction 57 over conductor 58 (shown broken at X—X). The amounts of level signal change required to cause the switch A-3 to change from open to closed or vice-versa is determined by the setting of the wiper arm of the span adjust control potentiometer R11. The span adjust potentiometer is connected as an intermediate resistor in a series resistor network comprising R33, R11, and R10 connected between the output terminal c of A-3 and the common conductor. The span adjust signal is actually a sample of the output of A-3 taken from the wiper arm of R11 and fed back to the non-inverting input terminal a of A-2. The output of A-32 is then applied to the non-inverting input of A-3 so that the output of A-3 is actually being fed back positively to the input of A-3. The effect of this connection is to cause the output of A-3 to latch into either positive or negative saturation whenever the value of the level measurement signal (applied to the $b$ terminal of the amplifier) crosses the value applied from the output of A-2 just before the switching action takes place.

An input-output characteristic graph of amplifier A-3 with adjustable hysteresis is shown in FIG. 6, where the ordinate $e_o$ is the amplifier output at terminal $c$ in volts D.C. and the abscissa $e_{in}$ is the voltage on the $b$ input terminal to common in volts D.C., and $e_H$ is the hysteresis voltage span.

The output terminal $c$ of amplifier A-3 is connected through resistor R32 to the base of an NPN transistor Q1. The base of Q1 is also connected to common through a diode D4. The emitter of transistor Q1 is connected through resistor R34 to the common conductor. The collector of Q1 is connected in series through a reed relay coil 64 to +15 volts D.C. A damping diode D8 is connected in shunt with the reed relay coil 64.

The reed relay coil 64 when energized closes the normally open reed relay switch S3. The normally open contacts of S3 are shown in FIG. 2 connected in series with the operating coil 65 of a standard four pole-double throw relay K1.

The reed relay driver transistor Q1 is connected so that when the amplifier A-3 is in positive saturation, Q1 is turned on thus energizing the reed relay coil 64 and closing the reed relay switch S3. When S3 closes, relay K1 is energized. When the amplifier A-3 is in negative saturation, Q1 is cut off, S3 opens and relay K1 is de-energized.

Referring to FIG. 2 the relay K1 includes a normally open set of switch contacts K1(1) in series with the "ladle stopper open" indicator lights I2 and I3 across 117 volts A.C. and a set of normally closed contacts K1(2) in series with parallel "ladle stopper close" indicator lights I4 and I5. It further includes a set of normally open contacts which are located in the Brun controlpor electric system (see FIG. 4) for controlling the air supply to the pneumatic motor 41 which actuates the tundish stopper rod 17 to open or close the stopper rod. It includes additional contacts to actuate any auxiliary devices desired. One such device would be the resistance-capacitance level simulator subsequently to be described.

UPPER LIMIT SWITCH

The upper limit switch 62 performs in the same manner as the level adjust switch 61 except that the hysteresis (or span) is fixed and there is no summing amplifier. It includes only one operational amplifier A-4 connected in the positive-feedback switching mode. The span is fixed at about five percent of full scale, but the switching level is adjustable via potentiometer R12.

Amplifier A-4 includes terminals $a$ to $g$ similar to amplifiers A-1, A-2 and A-3. The level measurement signal from the level signal divider junction 57 (FIG. 1) is fed through conductors 58 and 67 of the $-b$ terminal of A-4. Terminal $d$ is conected to +15 volts D.C., terminal $e$ is connected through trim resistors R35 to +15 volts, terminal $f$ is connected to —15 volts D.C., and terminal $g$ is connected to common. The output terminal $c$ is connected through R39 to the base of a read relay driver transistor Q2. The output terminal $c$ is also connected through resistors R38 and R40 in series to common. The junction of R38 and R40 is connected through resistor R36 in a positive feedback path to the $a$ input terminal of amplifier A-4. The input terminals $a$ and $b$ are connected through opposing protecting Zener diodes D5 and D6.

The switching level voltage is developed across potentiometer R12 connected in series circuit with resistor R13 between common and +15 v. The switching level voltage from the wiper arm of potentiometer R12 is fed through resistor R37 to the $a$ input terminal of amplifier A-4.

When the level signal coming through conductor 67 becomes high enough to cause switching to occur, transistor Q2 is deenergized. The driver Q2 which is connected in series circuit with an emitter resistor R41 and a reed relay switch coil 70 between common and +15 volts D.C. in turn causes the reed relay coil 70 to be deenergized. When the level in the tundish 11 is within a normal operating range and below the upper limit set in by the operator for switching of A-3, the driver Q2 is "on" and the reed relay coil 70 is energized thus closing the normally open reed relay switch S4. This arrangement is desirable so that if system power fails and the reed relay switch S4 is deenergized, it provides a fail-safe factor.

The normally open contacts of the reed relay switch S4 are shown in FIG. 2 connected in series with the operating coil 66 of a standard four-pole double-throw relay K2 across the 117 volt, 60 cycle A.C. supply. The relay K2 includes a pair of normally open contacts K2(2) located in the Brun Controlpor electrical system (see FIG. 4) for controlling the metal flow into the tundish by "on-off" control of the ladle stopper 17. A pair of normally closed switch contacts K2(1) are located in series with the parallel "overflow" indicator lights I6 and I7, and a set of normally closed contacts K2(3) are located in series with the audible alarm 56 across the 117 volts A.C. (see FIG. 2).

When overflow relay K2 is energized during the normal operation of the continuous casting system, the contacts K2(2) in the ladle stopper control circuit 124 (see FIG. 4) are closed, and the contacts K2(1) and contacts K2(3) in the "overflow" indicator light circuit 73 and in the audible overflow alarm circuit 74, respectively (see FIG. 2), are open. However, when the upper level limit of molten metal in the tundish 11 is sensed, and the reed relay switch S4 in the upper limit switch is opened, K2 becomes de-energized. Contacts K2(2) are then opened, causing the ladle stopper 17 to close, and contacts K2(1) and K2(3) are closed causing overflow indicator lights I6 and I7 to light and audible alarm 56 to sound, thereby indicating to the operator that a high level or overflow condition exists in the tundish 11.

ELECTRO-PNEUMATIC SYSTEM FOR ACTUATING THE LADLE STOPPER ROD

The electro-pneumatic system for actuating the ladle stopper rod 17 has been previously referred to as the Brun Controlpor system 40 in the description of FIG. 1. The components of the system with the exception of the pneumatic stopper rod actuating motor 41 and source of compressed air are enclosed within the housing 75 which is shown in FIG. 1 as a box having a rectangular face panel 76.

The pneumatic system for supplying air to the motor 41 is shown in FIG. 5. It includes an air supply line 77 from a source of compressed air (not shown) at sufficient pressure (50 p.s.i.g. to 150 p.s.i.g. maximum) for efficient operation of the motor 41, a filter 78, a lubricator 79, and a pilot-operated "Air on-off" valve 80 serially connected in the air supply line 77. The "Air on-off" valve 80 is controlled by air diverted from the air supply line 77 through conduit 81, and fed to the "Air on-off" valve pilot 83 through the manual pilot control valve 82. The "Air on-off" valve 80 and the manual pilot control valve 82 are three-way valves, shown diagrammatically, which normally connect their output lines 84 and 85, respectively, to their atmospheric exhaust ports 86 and 87, respectively. The pilot control valve 82 may be manually actuated to connect the high pressure line 81 to the output line 85 to supply high pressure fluid to the pilot 83 which in turn actuates the "Air on-off" valve to its "on" position whereby air is connected from the air supply line 77 to the conduit 84. The conduit 84 supplies high pressure air from the air supply line 77 to branch lines 88, 89, 90 and 91.

Branch lines 88 and 89 supply air for operating the pneumatic motor 41 in opposite directions. The branch line 88 supplies air to cause the motor piston 41a to descend and thus lift the stopper rod 17 by clockwise rotation of the stopper lever 20; it is therefore designated the "open" air supply line. The branch line 89 supplies air to cause the motor piston 41a to be moved up and thus close the stopper rod 17 by counterclockwise rotation of the lever 20. It is therefore designated the "close" air supply line.

The branch lines 88 and 89 supply air to the air input ports 93 and 94, respectively, of a main motor control valve 92. The main motor control valve 92 is a two-position, spring biased, fluid actuated, pilot controlled valve shown diagrammatically in FIG. 5. Besides the air input ports 93 and 94 it has an air exhaust port 95, and output ports 96 and 97, connected by conduits 98 and 99 to the upper and lower air chambers 100 and 101, respectively, of the pneumatic motor 41. A reciprocating valve member within the valve housing is normally biased by means of a spring 104 to the position shown in FIG. 5, where a valve passage 102 connects the input port 94 with the output port 97, and a valve passage 103 connects the port 96 with the exhaust port 95. In the normal position of the motor control valve 92, just described, which will be referred to as the "close mode," the upper chamber 100 of the pneumatic motor 41 communicates with the exhaust port 95 and the lower chamber 101 communicates with the "close" air input port 94.

A solenoid actuated pilot valve 107 in the pilot air line 90, when energized, admits high pressure air to the left end of the motor control valve 92 to force the reciprocating valve member to the right, overcoming the bias of spring 104. In the air actuated position of the motor control valve 92, which will be referred to as the "open mode," the output port 97 is connected to the exhaust port 95 through a valve passage 105 and the output port 96 will be connected to the air input port 93 through a valve passage 106. In the "open mode" of the main control valve 92 the lower chamber 101 of the pneumatic motor is connected to exhaust and the upper chamber 100 is connected with the "open" air input port 93.

In the "open" air line 88 are located a pressure regulator 114 and a pressure gage P1; in the "close" air line 89 are located a pressure regulator 108, and a pressure gage P2. Also located in the open air line 88 is a speed regulating valve 116 having an actuating knob 117 located in the face panel of the Controlpor housing 75. The valve 116 is a needle valve which regulates the flow of air to the upper chamber 100 of the motor 41, and thus regulates the speed for opening the ladle stopper rod 17, and is therefore called the "open" speed valve. A second similar speed regulating valve 118 is located in the exhaust line 120 and its operating knob 119 is also located on the face panel 76 of the Controlpor housing 75. The speed valve 118 may be adjusted to control the rate of closing of the stopper rod 17, and is therefore called a "close" speed valve.

In the conduits 98 and 99 going from the motor control valve outlet ports 96 and 97 and the upper and lower chamber, respectively, of the motor 41, are located quick release valves 109 and 111. The quick release valves 109 and 111 are two-positioned valves, having input ports 109a and 111a, respectively output ports 109b and 111b, respectively, and atmospheric exhaust ports 109c and 111c, respectively. They are differential pressure activated two-position valves which normally offer a through passage between their input ports and output ports. However, when the pressure at the input ports is reduced to atmospheric pressure, greater pressure from either the motor chamber 100 or 101 will cause the quick release valves to connect their output ports 109b or 111b to atmospheric pressure through exhaust ports 109c or 111c, respectively. The quick release valves provide quick dumping of the pressure and a low resistance path from the motor chamber 100 and 101 to atmosphere. This allows the operator to operate the motor manually with a lever.

A pilot actuated two-position exhaust valve 113 having an input port 113a and an exhaust port 113b, is connected to conduit 99 via conduit 122 and to the "close" speed regulator valve 118 via conduit 121. The exhaust valve 113 is normally biased by a spring 112 to a closed position as shown in FIG. 5. A solenoid actuated pilot control valve 123 in the pilot air line 91, when engaged, admits fluid to a pilot port 113d in the exhaust valve 113, to shift the exhaust valve to open position, thereby connecting conduits 121 and 122 to atmosphere.

FIG. 4 shows the electrical system 124 for control of the pneumatic system shown in FIG. 5. The purpose of the electrical system shown in FIG. 4 is to control the pilot valve 107 of the motor control valve 92 and the pilot valve 123 of the exhaust valve 113. An auxiliary function of the electrical system 124 is to control the operation of a clock (see FIG. 1) located on the Controlpor panel 76. The electrical system 124 includes a pair of leads 125 and 126 which are connected to 117 volts, 60 cycle, A.C. A fuse 127 and an on-off switch 128 are serially connected in lead 125. The solenoid coil 107a of the solenoid pilot valve 107, the solenoid coil 123a of the solenoid pilot valve 123, and a clock relay K4 are connected in parallel between the line 126 and one side of a normally closed manual switch 130. The other side of the manual switch 130 is connected through branch circuits 131 and 132 to the other 117-volt A.C. lead 125. Circuit 131 is designated an automatic control circuit and includes a pair of normally open relay contacts K3(1), and the normally open contacts K1(3) and K2(2) of the flow control relay K2 and the overflow relay K1, respectively, which are located in the Controlcast housing 43. Circuit 132 is a manual control circuit and includes a normally open push button switch 133. The switches 130 and 133 are manual override switches which are spring biased to their normal positions indicated in FIG. 4. If an operator wishes to override the signal coming through the automatic control circuit 131 to open or close the stopper ladle, he must hold the "open" or "close" switch push buttons depressed for such time as he has need to override the automatic control circuit 131.

The electrical system 124 may be placed in either an automatic or manual mode by means of the mode control circuit 134. The mode control circuit 134 includes a normally open "Auto" push button switch 135, and a normally closed "Manual" push button switch 136 in series with the energizing coil of the mode control relay K3 across the 117-volt A.C. line 125 and 126. The switches 135 and 136 are spring biased to their normal positions shown in FIG. 4. When depressed they move to their opposite positions and when released are returned by spring bias to their normal positions. The mode control relay K3 has two sets of normally open contacts K3(1) previously referred to, and K3(2) which are holding contacts located in a holding circuit 137, shunting the "Auto" mode switch 135. An "Auto" indicator light I8 is positioned in an indicator circuit 138 in parallel with the mode control relay K3.

When the "Auto" mode switch 135 is momentarily depressed, the mode control circuit 134 is completed through the normally closed "Manual" mode switch 136 and the mode control relay K3, enabling current to flow through the energizing coil of K3 and close the relay contacts K3(1) and K3(2). The "Auto" indicator light I8 comes on and the holding circuit 137 is completed by the closure of contacts K3(2) so that the mode control current will continue to be energized when the "Auto" switch 135 is released. When the operator wishes to switch to the manual mode he merely has to push the "Manual" mode switch 136 momentarily to cause the relay K3 to be de-energized and the holding circuit 137 to be opened. The automatic control circuit 131 will also be de-activated by opening of the contacts K3(1).

A pouring time clock circuit 139 is provided across the 117-volt A.C. line. The circuit 139 includes the normally open contacts K4(1) of the clock relay K4 and the pouring time clock 140. The pouring time clock 140 operates when the ladle stopper is open upon energizing of the clock relay K4 and closure of the relay contacts K4(1) to indicate to the operator how much molten metal is in the ladle in terms of time.

OPERATION OF THE ELECTRO-PNEUMATIC SYSTEMS

The electrical system 124 is activated by closing the power switch 128. Assuming that the continuous metal casting system is operating normally, with the tundish metal level within normal limits and the withdrawal speed of the casting 15 at a normal rate, the operator will preferably choose to put the Controlpor system in the Automatic Mode. He does this by pushing the "Auto" switch 135, thereby energizing the mode control circuit 134 and activating the mode relay K3. The mode control relay K3 when energizsed closes its contacts K3(1) and K3(2), thereby activating the automatic control circuit 131 for controlling the motor control valve pilot solenoid 107a, the exhaust valve pilot solenoid 123a and the pouring time clock relay K4. The automatic control circuit 131 thus activated is ready to respond to signals transmitted from the Controlcast system relays K1 and K2. The overflow relay K2 is normally energized when the Controlcast system is activated by closing its power switch S1, there being no overflow condition sensed by the tundish level gage 31. The relay contacts K2(2) are, therefore, closed and the automatic control circuit 131 will respond to signals from the flow control relay K1 via its contact K1(3). Relay K1 will open and close its contacts K1(3) in response to the opening and closing of the level span reed switch S3. The desired level span of molten metal in the tundish 11 is set into the level adjust switch 61 by means of the span adjust potentiometer R11 as has been previously described. Closing the flow control relay contacts K1(3) completes the automatic control circuit 131 and thus allows current flow through the valve solenoids 107a and 123a and through the clock relay K4. Energizing the valve solenoids 107a and 123a will actviate the pneumatic motor 41 to cause the motor to lift the stopper rod. Opening of the flow control relay contact K1(3) de-energizes the valve solenoids 107a and 123a, thus causing the pneumatic motor to close the ladle stopper 17.

If the upper level switch 62 senses an abnormally high level condition in the tundish 11, it causes the relay K2 to be de-energized, thus opening the overflow relay contacts K2(2). This breaks the circuit to the pilot valve solenoids 107a and 123a and pouring time clock relay K4 thereby overriding any other signal which might be coming from the flow control relay K1.

If emergency conditions arise, the operator can deenergize the pilot valve solenoids 107a and 123a and pouring time clock relay K4 by pushing the "Close" switch 130, or he can energize the valve solenoids 107a, 123a and clock relay K4 by pushing the "Open" switch 133.

As previously stated the automatic mode will be selected by the operator when the casting system is operating under normal conditions. He may switch to the manual mode at any time by depressing the "Manual" mode switch 136 thereby de-energizing the mode control relay K3. Usually the operator will select the manual mode of operation when he is starting and stopping the casting line operation.

The pneumatic motor control system shown in FIG. 5 is normally in the close mode of operation except when the pilot valve solenoids 107a and 123a are energized. In placing the pneumatic system in operation the operator moves the operating lever 82' on the panel 76 from the "Off" to "On," thereby moving the manual pilot control valve 82 from its position exhausting the pilot line 85, to its position admitting air from line 81 to the pilot 83 of the air on-off valve 80. The pilot 83 on receipe of high pressure air actuates the air on-off switch 80 from its position exhausting the conduit 84 to atmosphere, to its position admitting high pressure air to the conduit 84. The pneumatic system is then in a ready condition to respond to signals from the electrical system 124 to open and close the stopper rod 17.

An open signal from the electrical system 124 opens the solenoid pilot valve 107 and the solenoid pilot valve 123 to actuate the motor control valve 92 to its open mode and to actuate the exhaust valve 113 to its open position exhausting lines 121 and 122 to atmosphere. In the open mode the motor control valve passages 105 and 106 are moved to the right connecting exhaust port 95 with output port 97 and connecting input port 93 with output port 96, respectively.

Reduction of pressure in the line 122 to atmospheric pressure opens the quick release valve 111 to atmospheric through its exhaust port 111c. High pressure air admitted to conduit 98 through valve passage 106 causes the quick release valve 109 to be closed to atmospheric pressure, and present a through passage to the upper chamber 100 of the pneumatic motor 41. The high pressure in the upper chamber 100 forces the piston 41a downward while the air in lower chamber 101 is exhausted to atmosphere through the exhaust port 111c of the quick release valve 111. The operator can adjust the pressure and flow of the fluid to the upper chamber of motor 41 by means of the pressure regulator handle 114' and the open speed valve handle 117, both of which are located on the Controlpor panel 76.

A close signal from the electrical system 124 deenergizes the solenoids of pilot valves 107 and 123, cutting off high pressure air from the pilot of the motor control valve 92 and the exhaust valve 113, respectively, and simultaneously venting the pilot motors of valves 92 and 113 to atmosphere. The motor control valve 92 is moved by spring bias to the left where passage 102 connects the high pressure input port 94 to the output port 97 and valve passage 103 connects exhaust port 95 with the output port 96.

With the exhaust valve 113 closed, above atmospheric pressure is present in the input lines 98 and 99 to both of the quick release valves 109 and 111. Both quick release valves are therefore closed to atmosphere and present through passages from their input ports 109a and 111a to their output ports 109b and 111b, respectively. The high pressure air from the close line 89 is connected to the lower chamber 101 of the pneumatic motor 41, through the motor control valve 92. The upper chamber 100 of the motor 41 is connected to the high pressure air line 99 supplying the lower chamber via conduit 98, motor control valve passage 103, conduit 120, close speed regulator valve 119, conduits 121 and 122. Upward motion of the motor piston 41a is caused by greater force on the bottom surface of piston 41a than on the top surface as a result of the differential area between the top and bottom of the piston 41a since the pressure in the upper chamber is equal or slightly greater than the pressure in the lower chamber. The close speed regulator valve 118 regulates the flow of fluid from the upper chamber 100 and thus determines the rate of ascent of the motor piston 41a. The operator may adjust the air pressure to the lower chamber by means of the pressure regulator handle 115 located on the Controlpor panel 76. Likewise he can adjust the stopper closing speed by adjusting the handle 119 of the close speed regulating valve 118.

Should the operator want to operate the ladle stopper rod operating lever 20 manually, he can effectively remove most of the resistance of the motor 41 by switching the air on-off lever 82' to off. This action moves the manual valve 82 to exhaust position, opening the pilot line 85 to atmosphere and permitting the air on-off valve 80 to return to its exhaust position connecting conduit 84 to atmosphere. When conduit 84 is connected to atmosphere the motor control valve 92 will automatically be returned to its close mode and the exhaust valve 113 will automatically be closed irregardless of the signals received from the electrical system 124 effecting the solenoid pilot valve 107 and 123. With the line 84 at atmospheric pressure, the pilot motors for valves 92 and 113 will be exposed to atmospheric pressure whether the pilot valves 107 and 123 are open or closed. With the input line 98 of quick release valve 109 exposed to atmospheric pressure through valve passage 103, conduit 120, speed valve 118, conduits 121, 122, valve passage 102, pressure regulator 108, and conduits 89 and 84, and the input line 99 of quick release valve 111 exposed to atmospheric pressure through valve passage 102, pressure regulator 108 and conduits 89 and 84, the quick release valves will connect their output ports 109b and 111b to their exhaust ports 109c and 111c upon the occurrence of a slightly greater differential of pressure between their output ports and their input ports. Movement of the motor piston 41a in either direction will be sufficient to cause the quick release valve connecting the motor chamber whose volume is being reduced to open to atmosphere. Air will thus flow to and from the motor chambers 100 and 101 through the exhaust parts 109c and 111c respectively of the quick release valves 109 and 111 since the quick release valves are in the exhaust mode whenever their input ports are corrected to atmospheric pressure. The motor piston 41a can therefore be moved in either direction by manual actuation of lever 20 without any substantial resistance being offered by air trapped in the motor chambers or vacuum created therein.

The pneumatic system which has been described has several safety advantages. The stopper rod 17 is closed by the actuation of the pneumatic motor 41 in a differential pressure mode. This is accomplished by applying the closing pressure equally to both sides of a single connecting rod piston 41a. This procedure maximizes the control of the position, speed and force applied to the stopper rod 17. In the event of an electrical power failure, the stopper rod is automatically moved to the closed position and the Controlpor system automatically reverts to manual operation.

MODIFIED EMBODIMENTS

A modification of the embodiment of the Controlcast ladle control signal computer described in reference to FIGS. 1 through 3C is shown in FIG. 7. Since the withdrawal speed of the casting from the casting mold has a definite relation to the level of molten metal in the mold, a measurement of the mold level can be used to produce an electrical signal which is a function of the casting withdrawal speed. The modified system shown in FIG. 7 includes the Controlcast computer 38, a mold level detector 33, a mold level control 35, a tundish level detector 31 and a tundish control 37, which are identical to similarly numbered elements in FIG. 1. However, instead of having a tachometer for measuring the casting withdrawal speed as in the embodiment shown in FIG. 1, the modified embodiment of FIG. 7 derives a speed signal input for the Controlcast computer 38 from the mold level gage and control 35. The control current which is proportional to the withdrawal speed of the metal from the mold is fed from the mold level gage and control box 35 to the input winding of isolating magnetic amplifier 150. The control current flowing through the input winding of the isolating magnetic amplifier 150 produces a voltage signal output which is proportional to casting withdrawal speed. The voltage signal output is fed via conductor 151 to the speed control signal input of the Controlcast computer 38. The control current which flows through the input winding of the isolating magnetic amplifier is fed to the pinch roll motor 14 for varying the speed of the pinch rolls 13. The tundish level signal is measured and fed to the Controlcast computer exactly as in the system shown in FIG. 1. Except for the source of the speed signal input to the Controlcast computer 38, the system shown in FIG. 7 is otherwise identical to the system described with reference to FIGS. 1 through 3C.

A second modification of the embodiment described with reference to FIGS. 1 through 3C is illustrated in FIG. 8. The embodiment is designed to maintain constant casting speed without actual measurement of the tundish level. It includes the Controlcast computer 38 which is identical with the similarly numbered element 38 shown in FIG. 1 and shown by schematic diagrams in FIGS. 2 through 3C. The Controlcast computer 38 is supplied with a speed signal from the pinch roll tachometer 36 as in FIG. 1. However, instead of supplying an actual level measurement signal to the Controlcast computer, a simulated level signal input is supplied from an R–C timing network 160. The timing network 160 derives a D.C. voltage from a suitable power supply 161 through a relay controlled switch 165 and series resistor 164. The timing network includes the capacitor 162 and resistor 163 in parallel therewith connected in series with resistor 164 switch 165 and the power supply 161. Switch 165 includes a pole and a pair of contacts on the relay K1 in the Controlcast computer 38. It is normally closed when K1 is energized to send a control signal to open the ladle stopper 17. Switch 165 is open when K1 is de-energized and no signal is being sent from K1 to open the ladle stopper. The capacitor 162 and resistor 164 are sized so that the time response of the network (including capacitor 162 and resistors 163 and 164) will approximate that of the ladle-tundish system in supplying molten metal to the tundish when the ladle stopper is open to raise the level of metal in the tundish to a pre-set level.

When the switch 165 is open, capacitor 162 will discharge through resistor 163. When the switch 165 is closed (ladle stopper 17 open) the capacitor charges through resistor 164. The rising voltage on capacitor 162 when charging simulates the response of a level gage to the rising level of metal in the tudnish 11 as metal flows into the tundish from the ladle when the ladle stopper is open. The charge on capacitor 162 is the level signal input to the Controlcast computer 38. When the charge on capacitor 162 becomes great enough to correspond with a predetermined level condition within the tundish (which is set into the Controlcast computer by adjustment of the level adjust potentiometer R5) the Controlcast computer deenergizes the relay K1 thereby sending a signal to close the ladle stopper rod 17 and open the switch 165. Th capacitor 163 then discharges through resistor 163 at a rate which simulates the lowering of the level of molten metal in the tundish 11 as the molten metal flows from the tundish to the mold 12. When the charge in capacitor 162 has decreased to a voltage value corresponding to a pre-set lower level limit set into the Controlcast computer 38 by the span adjust potentiometer the computer 38 will energize relay K1 and again sent a signal to open the ladle stopper rod 17 and at the same time will close the switch 165. Capacitor 162 will begin to recharge, thus repeating the cycle just described.

It should be remembered that the level signal and the speed signals are combined within the computer so that the energizing and de-energizing of relay K1 is not purely a function of simulated level as described above for the sake of simplicity but is in the fact a function of casting withdrawal speed and simulated tundish level.

In another embodiment shown in FIG. 9 a detector unit 31 is positioned on one side of a tundish 11 to detect radiation from a radiation source 32 positioned on the other side of the tundish like in FIG. 1. The detector unit 31 however, has an upper limit detector 31A, a proportional detector 31B, and a lower limit detector 31C of a single proportional detector. The signal from the proportional detector is fed to a tundish level gage 37 which amplifies the signal and feeds it to a level signal dividing network 167 within the Controlcast system the same as shown in FIG. 1 and in FIG. 3A. The divided signal is then fed as one input to the level adjust switch 61. A speed error signal which is obtained by comparing a casting withdrawal speed signal with a speed reference signal within the component system 60 designated flow control is fed as a second input signal to the level adjust switch 61. The level adjust switch 61 is identical with the level adjust switch 61 shown in FIG. 3B and it controls a reed switch S3 which in turn controls a flow control relay K1 in exactly the same manner as previously described with reference to FIGS. 1, 2 and 3B. The upper level detector and the lower level detector are vertically positioned with respect to the tundish so that they will produce signals for controlling upper and lower limit switches 62' and 62" respectively whenever the level of molten metal reaches a selected maximum height or a selected minimum height. The signals from the detectors 31A and 31C are amplified in amplifier 37A and 37C and the amplified signals are then fed to the upper and lower switches respectively. The upper and lower limit switches 62' and 62" can be of numerous types however solid state switches similar to the upper limit switch 62 described with reference to FIG. 3C are preferred.

The function of the upper level switch 62' is identical with that described previously with respect to the upper level switch 62 and illustrated in FIG. 3C.

The lower limit detector 31C and lower limit switch 62" function to advise the operator when the level of metal in the tundish has fallen to the point where the heat capacity of the metal itself will no longer hold the mass at a proper casting temperature. It is entirely possible, and occasional occurs, that the tundish nozzle will wash out or erode away to the point that casting can only be continued with a very low head in the tundish. Otherwise, the flow of metal through the eroded tundish nozzle will be greater than the capacity of the remaining elements of the casting system. When the head gets very low, however, the metal cools rapidly causing premature congealing in the nozzle and in the mold. It is important that the operator, who is relieved by our system from looking in the tundish, be notified of this condition when it appears.

The lower limit switch 62" is shown to include a reed switch S5 similar to the reed switch S4 in the upper level switch 62'. S5 is in series circuit with the coil of a lower limit relay K5 across 117 volts 60 cycle AC. The relay K5, like relay K2, includes at least one switch pole K5(1) which may be opened and closed. The switch pole K5(1) is in series circuit with an indicator light I9 and an audible alarm 56' which are energized when a lower level limit condition of molten metal in the tundish is detected to warn the operator of this condition. The relay K5 and indicator light I9 and alarm 56' would preferably be connected across the power lines 54 and 55 in the system shown in FIG. 2 and would be contained within the Controlcast system housing 43 shown in FIG. 1. The light I9 would be positionied on the front panel of the Controlcast housing 43, in view of the operator. The relay K5 could have additional switch poles for auxiliary functions.

It has been mentioned previously in this specification that a control may be provided within the scope of the invention which system will operate a modulating stopper rod as well as an on-off stopper rod. FIG. 10 illustrates our invention functioning as a continuous controller to modulate a stopper rod rather than as an on-off controller to open and close a stopper rod. As shown in FIG. 10 a speed signal derived as described with respect to FIG. 1 is fed into the flow control component 60 shown in FIG. 3A, where it is compared with a speed reference signal which is set in by means of a speed adjust potentiometer R7. A speed error signal produced in the flow control component is then fed to a level adjust component 61 identical with the same component shown in FIG. 3B. A tundish level signal derived as before described, is also fed into the level adjust component 61. The level adjust component 61 uses the speed error signal to modify the tundish level signal and compute an operating level for the molten metal in the tundish. The set tundish level signal as modified by the speed error signal is applied to a position adjusting type controller 168. The position adjusting controller 168 compares the net tundish level signal from the position adjust component 61 with a feed back signal from a ladle stopper motor position transducer 172 to obtain an electric position correction signal. The electric position correction signal from the position adjusting controller 168 is fed to an electro-pneumatic converter 169 which converts the electric position signal to a pneumatic signal. The pneumatic signal controls an air regulator valve 170 located in an air line supplying operating fluid to a pneumatic motor which raises and lowers a ladle stopper (not shown) to control the rate of flow through the bottom discharge nozzle of the ladle. The ladle stopper motor is connected by suitable linkage to a position transducer which provides an electric signal that varies as a function of the ladle stopper motor position. The ladle stopper and bottom discharge nozzle must be so shaped that limited raising or lowering of the stopper rod without actually closing the stopper will increase or decrease the rate of flow of the molten metal through the ladle discharge nozzle.

The position adjusting controller 168, the electro-pneumatic converter, the air regulator valve, the pneumatic stopper operating motor 171 and the position transducer 172 are all conventional components which may be obtained from commercial outlets.

The advantage of the modulating stopper rod controller is that closer control of the level of metal in the tundish can be obtained than with the open-or-closed type stopper rod controller.

If close enough control of a ladle discharge can be obtained by modulating the ladle stopper rod to vary the rate of flow of metal from the ladle, the tundish can be dispensed with and the molten metal from the ladle can flow directly into the casting mold. One factor which in the past has prevented such close control has been the lack of suitable materials for the ladle and stopper to prevent excessive erosion of the stopper and ladle discharge nozzle by the molten metal. In the event suitable materials for the ladle dicharge nozzle and stopper are available which will prevent rapid erosion thereof, the control system shown in FIG. 10 can be readily altered to provide modulation of the ladle stopper rod in response to variation of the casting withdrawal speed from a predetermined speed set point. The alteration required to adapt the stopper modulating control system previously described and illustrated in FIG. 10 for operation without a tundish is indicated by the dotted line 174 representing a conductor which would connect the speed error signal from the error detector 175 directly to the Position Adjusting Type Controller 168. The circuitry between points 178, 178' would be disconnected.

FIG. 11 shows a continuous metal casting system simulator 199 which can be used to supply level and speed input signals into the Controlcast computer 38 for purpose of testing the control systems of the invention. The power supply 200 is a direct current voltage source simulating the capacity of the ladle 10 (see FIG. 1). The switch 201 simulates the opening and closing of the ladle stopper 17; resistor 202 simulates the size of the ladle discharge nozzle opening 19; capacitor 203 simulates the capacity of the tundish 11; resistors 204 and 205 together simulate the size of the tundish discharge opening 30, and resistor 205 alone simulates the tachometer measuring the withdrawal speed of the casting 15. The level signal and speed signal output leads from the simulator 199 would be connected to corresponding input terminals on the Controlcast computer.

When the switch 201 is opened, a closed ladle stopper condition is simulated. The charge on the capacitor 203 corresponding to the amount of molten metal in the tundish leaks off through the resistors 204 and 205. The flow of current through resistors 204 and 205 as the capacitor 203 discharges corresponds to the flow of molten metal through the tundish discharge opening 30. The decreasing voltage appearing at the level signal output corresponds to the decreasing molten metal level in the tundish as metal flows therefrom. The decreasing voltage at the speed signal output corresponds to the decreasing withdrawal speed of the casting 15 required to keep the level of molten metal in the mold near a predetermined set point as less and less metal flows into the mold 12. After a sufficient charge has leaked off the capacitor 203 to reduce the level signal and speed signal to cause the Controlcast computer 38 to send a demand signal to the Controlpor system for more metal in the tundish, the switch 201 is closed corresponding to opening of the ladle stopper 17 to permit metal to flow into the tundish 11. Current then flows from the negative terminal of the power supply 200 through resistors 205, 204, and 202 to the positive side of the power supply, and capacitor 203 charges through resistor 202 and the power supply. The current through resistor 202 corresponds to flow of metal from the ladle 10 to the tundish 11 and the increasing charge on capacitor 203 corresponds to the rising molten metal level in the tundish. The Controlcast computer in response to the level signal and speed signal will function exactly as if actual level and speed signals are being supplied, and will produce a close signal when the level and speed signals have reached certain values. The switch 201 is preferably a set of contacts on the flow control relay K1(3) located in the automatic control circuit 131 of the Controlpor electric system 124 shown in FIG. 4. By use of the casting system simulator 199 an operator can evaluate the proper functioning of the Controlcast computer 38 and the Controlpor electro-pneumatic stopper motor control 40.

It is within the scope of this invention to automatically regulate the supply of molten metal to the tundish whether the molten metal is being fed to the tundish from a bottom discharge ladle with an adjustable stopper as shown in FIG. 1 or by other molten metal supply vessels from which the discharge of molten metal can be controlled. One other such vessel is a tilting ladle 10' with a pouring spout 10" as shown in FIG. 12. Such a ladle may be supported over a tundish from a crane (not shown) by means of a cable 213 and connected hook 212 which hooks over a bail type handle 211 that is pivotally attached to trunnions 210 secured on opposite sides of the ladle 10'. A lever bar 20' attached to the bottom of the ladle serves as operating handle for tilting the ladle. The ladle may be tilted manually by lifting of the lever 20' or it may be tilted automatically by the same pneumatic motor 41 as is shown in FIG. 1. In the arrangement shown in FIG. 12, the pneumatic motor piston rod 42 is connected by a cable 216 to a boss 217 secured to the end of the lever bar 20'. The cable 212 is wrapped over a grooved pulley 216 which is rotatably supported by means of a bracket 215. The bracket 215 and motor 41 are mounted on fixed supports. The motor 41 receives actuating fluid from the Brun Controlpor system 40 (not shown in FIG. 12) via conduits 98 and 99, the same as shown in FIGS. 1 and 5. The weights of the ladle 10' and operating handle 20' are distributed with respect to the trunnions 210 in such a way that the ladle will tilt to a non-pouring position when an upward force exerted on the free end of the lever 20' is removed. The motor 41 will limit the clockwise tilting of the ladle 10' as the piston rod 42 is extended to its outer limit. The piston rod 42 can, alternatively be connected to the lever bar 20' by means of suitable rigid links so that the motor when supplied with actuating fluid will have positive control over the tilt of the ladle.

Another embodiment of the invention is shown in FIG. 13. In this embodiment the continuous metal casting system includes a ladle 10, a tundish 11, a casting mold 12, and casting withdrawal rolls 13. The system shown in FIG. 13 however differs form the basic system shown in FIG. 1 by providing the tundish 11 with a stopper rod 180 for control of the flow of metal through the tundish discharge outlet 30. The stopper rod 180 has a tapered end 181 which cooperates with the upper edge surrounding the tundish discharge opening 30 to vary the rate of flow of metal from the tundish 11 as the stopper is raised and lowered. When the stopper is lowered until the tapered edges of the stopper end 181 rest on the edge of tundish surrounding the opening 30, metal flow from the tundish is cut off. When the stopper is lifted, the space between the tapered end 181 of the stopper and the edge surrounding the opening 30 increases to permit a gradual increase in the rate of metal flow from the tundish. When the tapered end of the stopper is completely withdrawn from the opening 30, a maximum rate of metal flow from the tundish is established.

It is a function of the system shown in FIG. 13 to modulate the stopper rod 180 in response to variation of the level of molten metal in the mold 12 from a preselected set point in order to maintain the level of metal within the mold near the set point. So as to provide an adequate level of metal in the tundish 11 to enable the tundish stopper control to perform effectively, the flow of metal from the ladle 10 is controlled by means of a ladle stopper 17. The ladle stopper 17 is actuated by means of a pneumatic motor 41 in response to level signals from a tundish level gage 37 feeding into the Controlcast computer 38. The Controlcast computer 38 is identical with the same numbered component shown in FIG. 1, and further described with reference to FIGS. 2, and 3A through 3C. In the system shown in FIG. 13, however, the casting withdrawal speed will be maintained substantially constant because of the close control over the mold level provided by the modulating tundish stopper 180. The speed signal to the Controlcast computer is therefore not needed so the speed-level switch S-2 is thrown to the level position (see FIG. 3A) and the level adjust potentiometer R-5 is adjusted to set in a selected optimum level set point for metal in the tundish 11. The tundish level signal from the tundish gage 37 is compared with the tundish level set point in the section of the Controlcast computer designated level adjust switch 61 (see FIG. 3B) in the same manner as has been previously described for comparison of the withdrawal speed error signal and the tundish level signal in the system shown in FIG. 1.

Open and close signals from the level adjust switch 61 are fed to the electro-pneumatic controller 40, called Controlpor, which controls the pneumatic motor 41 to open and close tthe ladle stopper 17. It is necessary that there be adequate metal level in the tundish to permit the tundish stopper at full open position to supply metal to the mold at a rate equal to or greater than the metal withdrawal rate.

The mold level is measured by means of a nuclear radiation detector 33 which is positioned on one side of the mold 12 and senses the radiation passing through the mold from a nuclear radiation source 34 on the opposite side of the mold. The detected signals are fed to a mold level gage and mold level error detector 35 in the same manner as described with reference to FIG. 1, where they are amplified and compared with a mold level set point signal set in by means of a variable potentiometer 196 in a suitable voltage dividing network. The mold level error signal from the mold level gage and error detector 35 is fed to a position adjusting controller 187. The position adjusting controller 187 also receives a position feedback signal over conductor 195 from a position transducer 194. The position adjusting controller 187 compares the position feedback signal with the mold level error signal and produces an electric control current which is fed to an electro-pneumatic converter 188. The electro-pneumatic converter 188 converts the electric control current to a pneumatic signal which is derived from an air supply line 189 and is fed over a pilot line 197 to an air regulator valve 190. The air regulator valve responds to the pneumatic signal coming through the pilot line 197 to regulate the flow of air from the air supply line 189 to the pneumatic cylinder operator 191 through conduit 198. The pneumatic cylinder operator 191 is responsive to the flow of air through the air regulator valve 190 to vary the adjustment of the stopper rod 180 in varying amounts from fully closed to fully open positions as may be required to maintain the level of metal in the mold 12 at the preselected set point. The position of the motor piston rod 192 is fed back via the position transducer 194 to the position adjusting controller 187 so that the output of the position adjusting controller varies to cause the position of the motor to be at the value specified by the level set point.

The piston rod 192 is connected to the tundish stopper via a lever 186 and linkage 182. The lever 186 is pivoted about a horizontal pivot 185 in the bracket 183 attached to the tundish 11. A vertical slide bearing 184 through which the link 182 slides is mounted in the bracket 183.

The mold level error signal from the mold level error detector 35 may also be used to control the speed of the casting withdrawal motor 14 by means of the withdrawal motor speed controller 35A to increase or decrease the speed of the withdrawal motor as the level of metal in the mold rises above the set point or drops below the set point. The withdrawal motor speed control in the case of a closely regulated tundish outflow as described with reference to FIG. 13 would be auxiliary to the tundish flow control and would not necessarily be required unless a failure occurred in the tundish flow control system.

In addition to the modulating tundish stopper controller which has been described, upper and lower level limit detectors can be provided as safety expedients to detect underflow and overflow conditions within the mold 12. These detectors can be connected to alarms which would notify the operator of the abnormal level conditions.

Instead of the modulating stopper 180, the tundish could be provided with an on-off stopper similar to the stopper 17 in the ladle. The control thereof would be identical with the control described for the ladle stopper except that it would be responsive to mold level instead of tundish level. The control would include a second Controlcast computer 38 and a second Controlpor electro-pneumatic controller 40. The signal from the mold level gage 35 would be fed directly to the level signal input terminal of the Controlcast computer without being compared with a set point signal in a separate error detector because the Controlcast computer has a level set point adjust potentiometer R-5 and an error signal detector built in.

An adaptation of the invention for use in a multiple strand continuous metal casting system is illustrated in FIG. 14. The multiple strand metal casting system includes a ladle 10 with control stopper 17, a tundish 11' with two bottom discharge openings 30 and 30', two casting molds 12 and 12' positioned beneath the tundish openings 30 and 30' respectively, and two sets of pinch rolls 13 and 13' for withdrawing the castings from the bottom of the molds 12 and 12' respectively. The ladle 10 is identical with the ladle shown in FIG. 1 and includes a bottom discharge nozzle 16 for feeding metal into the tundish. The level of metal in the tundish 11' is sensed by means of a load cell 234 which produces an electrical signal which is proportional to the level of metal in the tundish. The load cell is a device responsive to weight of the tundish and metal in the tundish which transduces mechanical displacement resulting from increase or decrease in weight into a proportional electrical signal which can be calibrated in terms of level since level is a function of the variable weight of the molten metal in the tundish and the shape and size of the tundish which are constants.

While a load cell has been shown in FIG. 14 for measuring level in the tundish, a radiation level gage similar to the radiation gage 37 shown in FIG. 1 having a radiation source 32 and detector 31 could just as well be used as could other types of level gages adaptable for measuring the level of molten metal. The tundish level signal is fed to a lower level alarm 232 which is responsive to a predetermined minimum voltage corresponding to a selected abnormal low molten metal level in the tundish 11' and gives an alarm to warn an operator of the abnormal low level condition. The tundish level signal is also fed into the Controlcast computer 38 which is similar to the Controlcast computer 38 shown in FIG. 1, with the exception of a slight modification subsequently to be described.

The levels of molten metal in the molds 12 and 12' are measured by radiation type level gages including radiation sources 34, 34' and radiation detectors 33 and 33'. The electric level signals from the level detectors are fed into mold level gages and error detectors 35 and 35' respectively where they are amplified and compared with level set point signals to produce level error signals. The level error signals for each strand are fed into motor controllers 35A and 35A' which vary the speed of the casting withdrawal motors 14 and 14' in order to control the level of metal in the molds by varying the rate of the casting withdrawal speeds.

A pair of electric tachometers 36 and 36' are operatively connected to the pinch rolls 13 and 13' respectively, driven by motors 14 and 14' to measure the speed of withdrawal of each casting strand. The speed signals from the tachometers are fed into a multiple speed signal averaging circuit 220 which is provided with a speed signal selector switch 221. The selector switch 221 is adjustable to $n$ positions corresponding to the number of operating strands in the casting system and sets in the divisor for the speed averaging circuits. The averaging circuit 221 adds the tachometer input speed signals and divides the sum by the number of inputs to generate a signal that is proportional to the average speed of all operating strands. The selector switch 221 is normally driven by start relays in the mold level gages 35 and 35' so that its setting always represents the number of strands in actual operation. The average speed signal is then put into the Controlcast computer error detector 230 through the normally closed $b$ pole of the maximum speed override relay K6.

The error detector 230 corersponds to the resistive summing network comprising resistors R16, R17 and R19 illustrated in FIG. 3A and described with respect thereto. It is part of the overall flow control component 60 within the Controlcast computer 38 shown in detail in FIG. 3A. The flow control component 60 in the Controlcast computer when adapted for multistrand casting operations differs from the flow component shown in FIG. 3A by having two speed set point controls, 228 and 229, and switching means for alternatively connecting one or the other set point control to the error detector 230. The set point control 228 is used to set in the desired average speed set point. It is similar to the speed adjust potentiometer R7 shown in FIG. 3A. The set point control 229 is used to set in a maximum allowable strand speed set point. It too is a potentiometer like R7 and is connected in like manner. The set point switching means comprises a pair of poles $c$ and $d$ on the four pole relay K6. Pole $d$ is normally closed and connects the average speed set point control 228 to the error detector 230. The pole $c$ is normally open but when closed it connects the maximum speed set point control 229 to the error detector 230. In the error detector 230 the average speed signal is summed algebraically with the desired speed signal set in by the operator and the resultant signal, called a speed error signal, is fed to a proportional and reset amplifier 231. The proportional and reset amplifier 231 is the same as the amplifier A-1 shown in FIG. 3A. Its output is proportional to the speed error signal and time integral of the error signal. From the proportional and reset amplifier 231, the speed correction signal is fed to the level adjust switch 61 which is the same as the level adjust switch shown in FIG. 3B. The operation of the speed adjust switch for summing algebraically the speed corrections signals and a span signal set in by the span adjust potentiometer 233 and comparing the resultant signal with the tundish level signal to produce a stopper open or close signal has previously been described with reference to FIG. 3B. The stopper open or close signal is fed to the Controlpor electro-pneumatic controller 40 which converts the electric signal into a pneumatic control signal which causes the pneumatic motor 41 to open or close the ladle stopper.

In order to keep the speed of any one strand from becoming excessive, means are provided in the multistrand casting system controls shown in FIG. 14 to detect the strand which has a minimum allowable speed and cause a maximum speed override relay K6 to override the average speed control signal from the average speed computer 220 and feed the maximum speed signal to the Controlcast computer 38. The maximum speed control includes an upper bound selector 222 which receives speed signals S1 and S2 from each strand tachometer 36, 36′. The upper bound selector passes only the largest speed signal. Each speed signal is summed into a common point through a diode (not shown) and only the diode with the largest voltage conducts. The signal representing the fastest strand then goes through an R-C filter 223 (comprising resistor 224 and capacitor 225) into a maximum speed detector switch 226 where it is compared with a maximum speed set point in by an operator by adjustment of the maximum speed set point potentiometer 227. The switch 226 may be a solid state switch similar to te upper limit switch 62 shown in FIG. 3C. When the maximum speed signal coming tthrough the upper bound selector 222 and filter 223 exceeds the maximum speed set point set in by the operator, the maximum speed detector switch 226 operates to cause the normally open contacts $a$ and $c$ of relay K6 to close and the normally closed contacts $b$ and $d$ to open. The speed signal from the upper bound selector 222 is fed into the Controlcast computer 38 where it is summed algebraically in the error detector 230 with the maximum speed set point signal from the S max. S.P. potentiometer 229. The net signal is used to close the ladle stopper 27. As the normally open contacts of relay K6 close, the normally closed contacts open removing the average speed signal from the Controlcast computer 38. When the speed of the fastest strand drops below the maximum set speed, the relay K6 returns to its normal position and the ladle stopper is once again controlled on the basis of average strand speed. The filter 223 is a transient supperssor which serves to reduce the tendency of fast, short term variations of the highest strand speed signal from triggering the maximum speed detector switch.

As described above, the multiple strand speed control system controls on the basis of error in average speed with an upper limit override based on the maximum speed set point. By removing the speed averaging computer 220, the maximum speed detector switch 226 and relay K6, and connecting the output of the upper bound selector 222 directly to the Controlcast computer error detector 230, the system will control strictly on the basis of the deviation of the maximum strand speed from the maximum set point signal, S max. S.P. The steps to accomplish this type of control can, of course, be accomplished by simply closing the normally open and opening the normally closed contacts of relay K6, or the system can be built for maximum speed control only by leaving out the unnecessary items.

Although the multistrand casting system illustrated in FIG. 14 has provision for casting only two strands, the multistrand controls described with reference to FIG. 14 are adapted to control a system for casting any number of strands, $n$, where $n$ equals the number of operating strands.

Other modifications and variations of the present invention are possible in the light of the above teachings. Accordingly, it is not desired to limit the invention to the present disclosure and various modifications and equivalents may be resorted to falling within the spirit and scope of the invention as claimed.

What is claimed is:

1. In a continuous metal casting system having a continous metal casting mold, a variable speed casting withdrawal means for continuously withdrawing a solidifying casting from said casting mold and a feed vessel for feeding molten metal to said casting mold at a rate of delivery which is affected by the level of molten metal in said vessel, improved apparatus comprising a control system for maintaining molten metal level in said mold and casting withdrawal speed within predetermined acceptable limits, said control system having a first automatic control means for varying the speed of said casting withdrawal means in response to the variation of the level of molten metal in said mold above and below a predetermined reference level respectively, and a second automatic control means for regulating the flow of metal into said mold by adjusting the level of molten metal in said feed vessel to a computed operating level in order to keep the withdrawal speed variations within an acceptable limit, said second control means including means for producing a first electrical speed signal which is a function of the solidifying casting withdrawal speed, means for setting a second electrical speed signal which is a function of the desired casting withdrawal speed, means for comparing the first electrical speed signal and the second electrical speed signal to produce a speed error signal, means for producing an electrical level signal which is a function of the molten metal level in said feed vessel, an electrical computing means responsive to said electrical level signal and said speed error signal for computing the operating level for molten metal in the feed vessel necessary to reduce the speed error signal to zero, and means responsive to said computing means for supplying molten metal to said feed vessel to adjust the level of molten metal in said feed vessel to said computed operating level.

2. In a continuous metal casting system having a continuous metal casting mold, a variable speed casting withdrawal means for continuously withdrawing a solidifying casting from said casting mold and a feed vessel for feeding molten metal to said casting mold at a rate of delivery which is affected by the level of molten metal in said vessel, improved apparatus comprising a central system for maintaining molten metal level in said mold and casting withdrawing speed within predetermined acceptable limts, said control system having a first automatic control means for varying the speed of said casting withdrawal means in response to the variation of the level of molten metal in said mold above and below a predetermined reference level respectively, and a second automatic control means for regulating the flow of metal into said mold by adjusting the level of molten metal in said feed vessel to a computed operating level in order to keep the withdrawal speed variations within an acceptable limit, said second control means including means for producing a first speed signal which is a function of the solidifying casting withdrawal speed, means for setting a second speed signal which is a function of the desired casting withdrawal speed, means for comparing the first speed signal and the second speed signal to produce a speed error signal, means for producing a level signal which is a function of the molten metal level in said feed vessel, a computing means responsive to said level signal and said speed error signal for computing the operating level for molten metal in the feed vessel necessary to reduce the speed error signal to zero, and means responsive to said computing means for supplying molten metal to said feed vessel to adjust the level of molten metal in said feed vessel to said computed operating level.

3. In a continuous metal casting system having a continuous metal casting mold, a variable speed casting withdrawal means for continuously withdrawing a solidifying casting from said casting mold, and a feed vessel for feeding molten metal to said casting mold at a rate of delivery which is affected by the level of molten metal in said vessel, improved apparatus comprising a central system for maintaining the molten metal level in said mold and casting withdrawal speed within predetermined acceptable limits, said control system having a first automatic control means for varying the speed of said casting withdrawal means in response to the variation of the level of molten metal in said mold above and below a predetermined reference level rspectivly, and a second automatic control means for regulating the flow of metal into said mold by adjusting the level of molten metal in said feed vessel to a computed operating level in order to keep the withdrawal speed variations within an acceptable limit, said second control means including means for producing a first electrical speed signal which is a function of the solidifying casting withdrawal speed, means for setting a second electrical speed signal which is a function of the desired withdrawal speed, means for comparing said first electrical speed signal with said second electrical speed signal to produce a speed error signal, means for producing an electrical level signal which is a function of the molten metal level in said feed vessel, computing means responsive to said electrical speed error signal and said electrical level signal for computing the median level operating point for molten metal in the feed vessel necessary to reduce the speed error to zero, and for computing the minimum and maximum levels for molten metal in said feed vessel in accordance with a preselected level span variation above and below said median level operating point, and means responsive to said computing means for supplying molten metal to said feed vessel in order to maintain the level of molten metal in said feed vessel between said minimum and maximum levels.

4. In a continuous metal casting system having a continuous metal casting mold, a variable speed casting withdrawal means for continuously withdrawing a solidifying casting from said casting mold, and a feed vessel for feeding molten metal to said casting mold at a rate of delivery which is affected by the level of molten metal in said vessel, improved apparatus comprising a control system for maintaining the molten metal level in said mold and casting withdrawal speed within predetermined acceptable limits, said control system having a first automatic control means for varying the speed of said casting withdrawal means in response to the variation of the level of molten metal in said mold above and below a predetermined reference level respectively, and a second automatic control means for regulating the flow of metal into said mold by adjusting the level of molten metal in said feed vessel to a computed operating level in order to keep the withdrawal speed variations within an acceptable limit, said second control means including means for producing a first speed signal which is a function of the solidifying casting withdrawal speed, means for setting a second speed signal which is a function of the desired withdrawal speed, means for comparing said first speed signal with said second speed signal to produce a speed error signal, means for producing a level signal which is a function of the molten metal level in said feed vessel, a computing means responsive to said speed error signal and said level signal for computing the median level operating point for molten metal in the feed vessel necessary to reduce the speed error to zero, and for computing the minimum and maximum levels for molten metal in said feed vessel in accordance with a preselected level span variation above and below said median level operating point, and means responsive to said computing means for supplying molten metal to said feed vessel in order to maintain the level of molten metal in said feed vessel betwen said minimum and maximum levels.

5. The apparatus set forth in claim 1 wherein said means for producing said first speed signal is an electrical tachometer generator having driving means for driving it at a rate which is a function of the casting withdrawal speed.

6. The apparatus set forth in claim 1 wherein said means responsive to said computing means for supplying molten metal is a ladle having a bottom discharge nozzle, a stopper mounted above said nozzle for reciprocation in alignment therewith to open and close said nozzle, means for reciprocating said stopper, operative means connecting said reciprocating means to said stopper, and control means for operating said reciprocating means in response to said computing means.

7. The apparatus set forth in claim 1 wherein said means responsive to said computing means for supplying molten metal includes a ladle having a top pouring spout, means for rotating said ladle to cause metal to flow from said spout and control means for controlling said rotating means in response to said computing means.

8. The apparatus set forth in claim 6 wherein said reciprocating means is a reciprocating fluid motor and said control means includes a source of working fluid, a working fluid distribution system for operating said fluid motor, and an electrical control system including automatic circuit means responsive to said computing means for controlling said fluid distribution system whereby said motor will reciprocate to open and close such stopper.

9. The apparatus set forth in claim 7 wherein said rotating means is a reciprocating fluid motor operatively connected to said ladle, and said control means includes a source of working fluid, a working fluid distribution system for operating said motor, and an eletcrical control system including automatic circuit means responsive to said computing means for controlling said fluid distribution system whereby said motor will rotate said ladle to start or stop the flow of metal from said pouring spout.

10. The apparatus set forth in claim 8 wherein said electrical control system includes in addition to said automatic circuit means, a normally inactive manual control circuit parallelling said automatic control circuit means and a mode selection means for selecting whether the control of said fluid distribution system will be responsive to said automatic or manual control circuits.

11. The apparatus set forth in claim 10 wherein said electric control system also includes manual means to override said automatic control means even though the mode selection means is in automatic.

12. The apparatus set forth in claim 3 wherein said computing means includes switch means to produce an electric pour signal when the minimum level condition is computed and an electrical non-pour signal when the maximum level condition is computed.

13. The apparatus set forth in claim 3 wherein said computing means includes switch means to produce a pour signal when the minimum level condition is computed and a non-pour signal when the maximum level condition is computed.

14. The apparatus set forth in claim 13 together with indicator means to indicate when the computing means is producing a pour signal, or a non-pour signal.

15. The apparatus set forth in claim 13 wherein said switch means includes a solid state switch having adjustable hysteresis, and means for adjusting the hysteresis of said solid state switch in order to vary the level span of molten metal in said feed vessel.

16. The apparatus set forth in claim 1 wherein said first control means includes means for measuring the level of molten metal in said mold and producing an electrical mold level signal, means for setting a predetermined reference level signal, means for comparing said mold level signal with said reference level signal and producing a mold level error signal and a variable control means responsive to said mold level error signal for varying the speed of said casting withdrawal means as said level of molten metal in said mold increases and decreases.

17. The apparatus set forth in claim 8 together with means for detecting an upper level limit condition of molten metal in said feed vessel and producing an upper level limit signal, and wherein said automatic control circuit includes means which is normally inactive but which is activated in response to said upper level limit signal to cause said electrical control system to function to close said stopper.

18. The apparatus set forth in claim 1 together with means for detecting a lower level limit condition of molten metal in said feed vessel, and for producing a lower level limit signal.

19. The system set forth in claim 1 wherein said feed vessel has controllable means for dispensing molten metal therefrom at a gradually variable rate of flow.

20. The system set forth in claim 1 wherein said means for supplying molten metal to said feed vessel is controllable to supply molten metal at a gradually variable rate of flow.

21. A continuous metal casting system comprising plural mold means for simultaneously producing a plurality of continuous metal castings, variable speed casting withdrawal means associated with each casting for continuously withdrawing the castings from said plural mold means, a controllable feed means for feeding molten metal to the mold means, means associated with each mold for measuring the level of molten metal in each mold and producing a measured mold level signal, means associated with each mold for producing a predetermined selected mold level reference signal, means associated with each mold for comparing the measured mold level signal with the mold level reference signal of the associated mold and producing a mold level error signal and separate automatic control means associated with each mold and its associated casting withdrawal means which responds to the mold level error signal of the associated mold by varying the speed of said casing withdrawal means to tend to zero the mold level error signal, means associated with each casting for producing a speed signal which is a function of the casting withdrawal speed, means responsive to said speed signals for averaging the speeds of all of the castings and producing an average speed signal, means for setting a selected average speed signal which is a function of the desired average casting withdrawal speed, comparing means for normally comparing the average speed signal with the selected average speed signal to produce a speed error signal, and means responsive to said speed error signal to adjust said controllable feed means to reduce the speed error signal to zero.

22. The system set forth in claim 21 together with an upper bound selector means which is responsive to all the speed signals from said plurality of castings to select the greatest withdrawal speed and to pass only the greatest withdrawal speed signal, means for setting a first selected maximum speed signal which is a function of a desired maximum withdrawal speed for any one of the castings, means comparing said greatest withdrawal speed signal with said first selected maximum speed signal and operating an override means when said greatest withdrawal speed signal equals and exceeds said first selected maximum speed signal, means for setting a second selected maximum speed signal, said override means functioning when said greatest withdrawal speed signal equals and exceeds said first selected maximum speed signal to remove said average speed signal and the selected average speed signal from said first recited comparing means and to apply said second selected maximum speed signal and said greatest withdrawal speed in their stead so that said first recited comparing means compares said second selected maximum speed signal with said greatest withdrawal speed to produce a speed error signal.

23. A continuous metal casting system comprising plural mold means for simultaneously producing a plurality of continuous metal castings, a variable speed casting withdrawal means associated with each casting for continuously withdrawing the castings from said plural mold means, a controllable feed means for feeding molten metal to said mold means, means associated with each mold for measuring the level of molten metal in each mold and producing a measured mold level signal, means associated with each mold for producing a predetermined selected mold level reference signal, means associated with each mold for comparing the measured mold level signal with the mold level reference signal of the associated mold and producing a mold level error signal and separate automatic control means associated with each mold and its associated casting withdrawal means which responds to the mold level error signal of the associated mold by varying the speed of said casting withdrawal means to tend to zero the mold level error signal, means associated with each casting for producing a speed signal which is a function of the casting withdrawal speed, means responsive to all of said withdrawal speed signals for selecting the withdrawal speed signal for the casting having the greatest speed and passing only said speed signal corresponding to the greatest speed, means for setting a selected speed signal which is a function of the desired casting withdrawal speed, comparing means for comparing said selected speed signal with the speed signal for the casting having the greatest withdrawal speed to produce a speed error signal, and means responsive to said speed error signal to adjust said controllable feed means to reduce the speed error signal to zero.

24. A continuous metal casting system comprising plural mold means for producing a plurality of continuous metal castings, a variable speed casting withdrawal means associated with each casting for continuously withdrawing the castings from said plural mold means, a feed vessel for feeding molten metal to said mold means at a rate of delivery which is affected by the level of the molten metal in said vessel, means associated with each mold for measuring the level of molten metal in each mold and its associated casting withdrawal means which responds to the mold level error signal of the associated with each mold for comparing the measured mold level signal with the mold level reference signal of the associated mold and producing a mold level error signal and separate automatic control means associated with each mold and its associated casting withdrawal means which responds to the mold level error signal of the associated mold by varying the speed of said casting withdrawal means to tend to zero the mold level error signal, means associated with each casting for producing an electrical speed signal which is a function of the casting withdrawal speed, means responsive to the electrical speed signals from all the castings for averaging said casting speeds and producing an electrical average speed signal, means for setting a selected electrical speed signal which is a function of the desired withdrawal speed, means for comparing the electrical average speed signal with the selected electrical speed signal to produce a speed error signal, means for producing an electrical level signal which is a function of the molten metal level in said feed vessel, an electrical computing means responsive to said electrical level signal and said speed error signal for computing the operating level for molten metal in the feed vessel necessary to reduce the speed error signal to zero, and means responsive to said computing means for supplying molten metal to said feed vessel in such a way as to maintain the level of molten metal in said feed vessel at approximately said operating level.

25. A continuous metal casting system comprising plural mold means for producing a plurality of continuous metal castings, a variable speed casting withdrawal means associated with each casting for continuously withdrawing the castings from said plural mold means, a feed vessel for feeding molten metal to said mold means at a rate of delivery which is affected by the level of the molten metal in said vessel, means associated with each mold for measuring the level of molten metal in each mold and producing a measured mold level signal, means associated with each mold for producing a predetermined selected mold level reference signal, means associated with each mold for comparing the measured mold level signal with the mold level reference signal of the associated mold and producing a mold level error signal and separate automatic control means associated with each mold and its associated casting withdrawal means which responds to the mold level error signal of the associated mold by varying the speed of said casting withdrawal means to tend to zero the mold level error signal, means associated with each casting for producing a speed signal which is a function of the casting withdrawal speed, means responsive to the signals from all the castings for averaging said casting speeds and producing an average speed signal, means for setting a selected speed signal which is a function of the desired casting withdrawal speed, means for comparing the average speed signal with the selected speed signal to produce a speed error signal, means for producing a level signal which is a function of the molten metal level in said feed vessel, computing means responsive to said level signal and said speed error signal for computing the operating level for molten metal in the feed vessel necessary to reduce the speed error signal to zero, and controllable feed means responsive to said computing means for supplying molten metal to said feed vessel in such a way as to maintain the level of molten metal in said feed vessel at approximately said operating level.

26. A continuous metal casting system comprising plural mold means for producing a plurality of continuous metal castings, a variable speed casting withdrawal means associated with each casting for continuously withdrawing the castings from said plural mold means, a feed vessel for feeding molten metal to said mold means at a rate of delivery which is affected by the level of the molten metal in said vessel, means associated with each mold for measuring the level of molten metal in each mold and producing a measured mold level signal, means associated with each mold for producing a predetermined selected mold level reference signal, means associated with each mold for comparing the measured mold level signal with the mold level reference signal of the associated mold and producing a mold level error signal and separate automatic control means associated with each mold and its associated casting withdrawal means which responds to the mold level error signal of the associated mold by varying the speed of said casting withdrawal means to tend to zero the mold level error signal, means associated with each casting for producing a withdrawal speed signal which is a function of the casting withdrawal speed, means responsive to the withdrawal speed signals from all the castings for selecting the withdrawal speed signal for the casting saving the greatest speed and passing only the greatest withdrawal speed signal, means for setting a selected speed signal which is a function of the desired casting withdrawal speed, means for comparing the greatest withdrawal speed signal with the selected speed signal to produce a speed error signal, means for producing a level signal which is a function of the molten metal level in said feed vessel, a computing means responsive to said level signal and said speed error signal for computing the operating level for molten metal in the feed vessel necessary to reduce the speed error signal to zero, and means responsive to said computing means for supplying molten metal to said feed vessel in such a way as to maintain the level of molten metal in said feed vessel at approximately said operating level.

27. The system set forth in claim 21 together with means responsive to the speed signals from all of said plurality of castings so as to always select the greatest speed signal, means for setting a speed limit signal, means comparing said greatest speed signal with said speed limit signal to generate an override signal whenever said greatest speed signal equals or exceeds said speed limit signal, means responsive to said override signal and operative only when such override signal exists to adjust said controllable feed means so as to reduce the flow of molten metal to said mold means irrespective of said speed error signal.

28. The system set forth in claim 21 together with means responsive to the speed signals from all of said plurality of castings so as to always select the greatest speed signal, means for setting a selected maximum speed signal, means comparing said greatest speed signal with said selected maximum speed signal to generate during each period that said greatest speed signal equals or exceeds said selected maximum signal an override signal and a second speed error signal, means responsive to said override signal and said second speed error signal and operative only when said override signal exists to cause said means normally responsive to said speed error signal to be during said period responsive instead to said second speed error signal and to adjust said controllable feed means to reduce said second speed error signal to zero.

29. The system set forth in claim 25 together with means responsive to the speed signals from all of said plurality of castings so as to always select the greatest speed signal, means for setting a speed limit signal, means comparing said greatest speed signal with said speed limit signal to generate an override signal whenever said greatest speed signal equals or exceeds said speed limit signal, means responsive to said override signal and operative only when such override signal exists to adjust said controllable feed means so as to reduce the flow of molten metal to said mold means irrespective of said speed error signal.

30. The system set forth in claim 25 together with means responsive to the speed signals from all of said plurality of castings so as to always select the greatest speed signal, means for setting a selected maximum speed signal, means comparing said greatest speed signal with said selected maximum speed signal to generate during each period that said greatest speed signal equals or exceeds said selected maximum signal an override signal and a second speed error signal, means responsive to said override signal and said second speed error signal and operative only when said override signal exists to cause said means normally responsive to said speed error signal to be during said period responsive instead to said second speed error signal and to adjust said controllable feed means to reduce said second speed error signal to zero.

References Cited

UNITED STATES PATENTS

| 3,349,834 | 10/1967 | Wilson | 164—155 |
| 2,246,907 | 6/1941 | Webster | 164—155 |
| 2,825,104 | 3/1958 | Jones | 164—281 X |
| 3,300,820 | 1/1967 | Tiskus et al. | 164—155 |
| 3,358,743 | 12/1967 | Adams | 164—154 |
| 3,375,862 | 4/1968 | Boitchenko et al. | 164—81 X |

FOREIGN PATENTS

| 1,373,146 | 8/1964 | France. |

J. SPENCER OVERHOLSER, Primary Examiner

R. S. ANNEAR, Assistant Examiner